(12) United States Patent
Michels et al.

(10) Patent No.: US 10,731,031 B2
(45) Date of Patent: Aug. 4, 2020

(54) METHOD FOR PRODUCING ABS PLASTICS HAVING IMPROVED PROPERTIES

(71) Applicant: INEOS STYROLUTION GROUP GMBH, Frankfurt am Main (DE)

(72) Inventors: Gisbert Michels, Leverkusen (DE); Norbert Niessner, Friedelsheim (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 161 days.

(21) Appl. No.: 15/780,353

(22) PCT Filed: Dec. 2, 2016

(86) PCT No.: PCT/EP2016/079556
§ 371 (c)(1),
(2) Date: May 31, 2018

(87) PCT Pub. No.: WO2017/093468
PCT Pub. Date: Jun. 8, 2017

(65) Prior Publication Data
US 2018/0355160 A1  Dec. 13, 2018

(30) Foreign Application Priority Data

Dec. 2, 2015 (EP) ..................................... 15197523
Sep. 27, 2016 (EP) ..................................... 16190743

(51) Int. Cl.
*C08L 25/12* (2006.01)
*C08F 6/00* (2006.01)
*C08L 55/02* (2006.01)

(52) U.S. Cl.
CPC .............. *C08L 25/12* (2013.01); *C08F 6/005* (2013.01); *C08F 6/008* (2013.01); *C08L 55/02* (2013.01); *C08L 2205/03* (2013.01)

(58) Field of Classification Search
CPC combination set(s) only.
See application file for complete search history.

(56) References Cited

U.S. PATENT DOCUMENTS

| | | |
|---|---|---|
| 3,553,167 A | 1/1971 | Hermann et al. |
| 4,009,226 A | 2/1977 | Ott et al. |
| 4,075,173 A | 2/1978 | Maruyama et al. |
| 4,181,788 A | 1/1980 | Wingler et al. |
| 4,311,823 A | 1/1982 | Imai et al. |
| 4,772,743 A | 9/1988 | Schmidt et al. |
| 5,071,946 A | 12/1991 | Schmidt et al. |
| 5,080,845 A | 1/1992 | Herrmann et al. |
| 5,883,189 A | 3/1999 | Eichenauer et al. |
| 5,910,276 A | 6/1999 | Guntherberg et al. |
| 5,994,463 A | 11/1999 | Eckel et al. |
| 7,790,805 B2 | 9/2010 | Eichenauer et al. |
| 2003/0027898 A1 | 2/2003 | Eichenauer et al. |
| 2003/0092836 A1 | 5/2003 | Eichenauer et al. |
| 2004/0132905 A1 | 7/2004 | Eichenauer et al. |
| 2004/0255780 A1 | 12/2004 | Konig et al. |
| 2008/0067711 A1 | 3/2008 | Schwemler et al. |
| 2010/0210789 A1 | 8/2010 | Seidel et al. |
| 2013/0281595 A1 | 10/2013 | Seidel et al. |
| 2015/0361225 A1* | 12/2015 | Thiem ...................... C08F 6/008 523/351 |
| 2016/0009870 A1* | 1/2016 | Thiem ...................... C08J 3/203 428/457 |
| 2016/0083572 A1 | 3/2016 | Niessner et al. |
| 2018/0118932 A1 | 5/2018 | Michels |

FOREIGN PATENT DOCUMENTS

| | | |
|---|---|---|
| CA | 1100681 A | 5/1981 |
| CA | 1173998 A | 9/1984 |
| DE | 1495626 B1 | 6/1971 |
| DE | 2232877 A1 | 1/1974 |
| DE | 2420358 A1 | 12/1975 |
| DE | 2703376 A1 | 8/1977 |

(Continued)

OTHER PUBLICATIONS

English-language translation of International Preliminary Report on Patentability in International Application No. PCT/EP2016/079556, dated Jun. 7, 2018.
Krischer/Kroll, Trocknungstechnik, Zweiter Band, Trockner and Trocknungsverfahren, Springer-Verlag, 1959, pp. 275-282; the relevance of which is discussed at p. 5, lines 2-5 and lines 14-17 of the specification (English-language translation)
W. Scholtan, H. Lange: Kolloid Z. u. Z. Polymere, 1972, 250, pp. 782-796; the relevance of which is discussed at p. 11, lines 16-18 of the specification (English-language translation).

(Continued)

*Primary Examiner* — Mark S Kaucher
(74) *Attorney, Agent, or Firm* — J.A. Lindeman & Co. PLLC

(57) ABSTRACT

The invention relates to a method for producing thermoplastic molding materials based on acrylonitrile-butadiene-styrene copolymers (ABS) having improved surface properties, in particular improved resistance of the surface quality to storage in a warm, humid environment, and having a reduced content of residual monomers. The invention further relates to the use of a fluid bed dryer and/or a flash dryer in the production of thermoplastic ABS molding materials in order to improve the surface quality. The invention further relates to the use of a fluid bed dryer and/or a flash dryer in the production of thermoplastic ABS molding materials having a reduced content of residual monomers. The invention further relates to ABS molding materials that can be produced by means of the method according to the invention and to molded parts (e.g., molded bodies, films, and coatings) that can be produced from the thermoplastic molding materials according to the invention.

15 Claims, 3 Drawing Sheets

(56) References Cited

FOREIGN PATENT DOCUMENTS

| | | |
|---|---|---|
| DE | 2714544 A1 | 10/1977 |
| DE | 2724360 A1 | 12/1978 |
| DE | 3000610 A1 | 7/1980 |
| DE | 3007934 A1 | 9/1981 |
| DE | 3639904 A1 | 6/1988 |
| DE | 3832396 A1 | 2/1990 |
| DE | 3840293 A1 | 5/1990 |
| DE | 3913509 A1 | 10/1990 |
| DE | 19547975 A1 | 6/1997 |
| DE | 19649255 A1 | 6/1998 |
| DE | 19713509 A1 | 10/1998 |
| DE | 10008420 A1 | 8/2001 |
| DE | 102007029010 A1 | 2/2008 |
| EP | 0022200 A1 | 1/1981 |
| EP | 0734825 A1 | 3/1996 |
| EP | 1415693 A1 | 10/2003 |
| EP | 1567596 B1 | 11/2003 |
| EP | 2606073 A1 | 6/2013 |
| WO | 01/62812 A1 | 8/2001 |
| WO | 01/62848 A1 | 8/2001 |
| WO | 2004/050765 A1 | 6/2004 |
| WO | 2010/094416 A1 | 8/2010 |
| WO | 2012/022710 A1 | 2/2012 |
| WO | 2013/160029 A1 | 10/2013 |
| WO | 2013/160249 A1 | 10/2013 |
| WO | 2014/122179 A1 | 8/2014 |
| WO | 2014/170407 A1 | 10/2014 |
| WO | 2016/184765 A1 | 11/2016 |

OTHER PUBLICATIONS

Houben-Weyl "Methoden der Organischen Chemie, Makromolekulare Stoffe", Teil 1, Thieme Verlag, Sruttgart, 1961, p. 307, p. 339; the relevance of which is discussed at p. 11, lines 19-22 and at p. 11, line 40-p. 12, line 2 of the specification (English-language translation).

K. Kirchner, H. Schlapkohl "The Formation of Oligomers in the Thermal Copolymerisation of the Styrene/Acrylonitrile-System", Makromol. Chem., 1976, 177, pp. 2031-2042; the relevance of which is discussed at p. 34, lines 22-25 of the specification (English-language translation).

* cited by examiner

METHOD FOR PRODUCING ABS PLASTICS HAVING IMPROVED PROPERTIES

The invention relates to a process for the production of thermoplastic molding compositions based on acrylonitrile-butadiene-styrene copolymers (ABS) with improved surface properties, in particular improved robustness of surface quality on storage in a hot moist environment, and with improved residual monomer content. The invention further relates to the use of a fluidized-bed drier and/or of a pneumatic drier in the production of thermoplastic ABS molding compositions, in order to improve surface quality. The invention further relates to the use of a fluidized-bed drier and/or of a pneumatic drier in the production of thermoplastic ABS molding compositions with reduced residual monomer content. The invention likewise relates to ABS molding compositions which can be produced by means of the process of the invention, and also to moldings (e.g. molded products, films and coatings) which can be produced from the thermoplastic molding compositions of the invention.

Acrylonitrile-butadiene-styrene copolymers (ABS) and acrylonitrile-butadiene-methylstyrene copolymers have already been used for many years in large quantities as thermoplastic molding compositions for the production of moldings of all types. It is known that styrene-acrylonitrile copolymers (SAN) or methylstyrene-acrylonitrile copolymers can be modified for improved impact resistance by incorporating graft rubbers, for example grafted polybutadiene rubbers. In principle, these impact-modified SAN molding compositions can be produced by graft polymerization of styrene and acrylonitrile in the presence of a polybutadiene rubber and/or by subsequent blending of a graft copolymer with a separately produced polymeric styrene-acrylonitrile matrix. It is possible here to achieve wide variation of the property profile of the molding compositions and of the moldings produced therefrom.

In a conventional procedure often used, the average particle size of the rubber is adjusted in a controlled manner by agglomeration before the graft polymerization reaction, because the size of the rubber particles has a substantial effect on the physical properties of the subsequent thermoplastic molding compositions. This agglomeration can by way of example be achieved by treating the rubber with a salt solution or a salt/acid solution. By way of example, WO 2014/170407 describes agglomeration with use of a specific agglomerating copolymer. WO 2012/022710 describes by way of example agglomeration with use of acetic anhydride.

A graft copolymer is then typically produced via reaction of the agglomerated rubber with styrene and acrylonitrile, with use of an initiator (graft copolymerization). These processes are described by way of example in EP-A 022 200. In another conventional procedure, the graft copolymer is washed and dried after the graft polymerization reaction. The document EP-A 0 734 825 describes the dewatering and drying of an ABS graft copolymer in an extruder.

Particularly important properties of ABS molding compositions, alongside the particularly advantageous mechanical properties such as high toughness (impact resistance, notched impact resistance), high elasticity (modulus of elasticity), good processability (thermoplastic flowability, MVR), and high heat resistance, are surface properties such as gloss, smoothness, homogeneity and uniform appearance. ABS molding compositions, and the moldings produced therefrom, are in particular intended to have good surface homogeneity, i.e. a surface without defects such as depressions, cracks or salt inclusions. A very significant property for certain application sectors in this context is retention of surface homogeneity under hot moist environmental conditions. A hot moist environment generally means conditions comprising a temperature and a humidity level exceeding the usual values of from 15 to 25° C. and from 30 to 60% relative humidity. Hot moist environmental conditions can moreover in particular comprise direct contact of the relevant surface with liquid water, e.g. condensation.

The salt inclusions that are present in the ABS molding composition, and in the molding produced therefrom, as a result of production processes often impair surface quality, and this is apparent in particular after extrusion of the molding composition. Under hot moist environmental conditions, the salt inclusions moreover absorb moisture and become enlarged and sometimes disintegrate. This produces defects on the surface (specks), for example white spots, depressions (cavities) and/or cracks, with resultant impairment of surface quality, in particular of surface homogeneity.

The documents WO 2001/62812, WO 2001/62848, DE-A 19649255 and WO 2004/050765 describe ABS molding compositions which comprise at least two graft rubber polymers, where the graft rubbers can by way of example be produced via persulfate initiation. Although the ABS molding compositions described in those documents have high toughness and good processability, the surface homogeneity of the molding compositions typically deteriorates under hot moist environmental conditions.

The salt inclusions in ABS molding compositions generally result from salts and acids used during production of the ABS molding compositions, in particular from the salts and acids used as coagulants during the precipitation of the graft copolymer, examples being alkali metal salts, alkaline earth metal salts and aluminum salts such as chlorides, sulfates, nitrates, phosphates, acetates, formates, aluminates and carbonates. Removal of this salt content in downstream washing and purification steps is often complicated and possible only with high usage of energy and of water. Another possible method of avoiding disadvantageous formation of surface defects (specks) is to repeat extrusion of the molding composition after storage in hot moist conditions; this incurs high additional technical cost.

The documents WO 2013/160029 and WO 2013/160249 describe polymer compositions, in particular ABS compositions, and processes for production thereof, the intention here being that the ABS compositions feature improved surface after storage under hot moist conditions. The document WO 2013/160029 describes polymer compositions comprising a graft copolymer produced via emulsion polymerization, where the graft copolymer has been precipitated by use of an alkaline earth metal salt in an alkaline medium and comprises sodium ions and magnesium ions and/or calcium ions in a Na/(Mg+Ca) ratio of 0.1 to 1. The document WO 2013/160249 says that formation of large salt crystallites can be prevented by subjecting the precipitated graft copolymer to melt filtration. The ABS compositions of WO 2013/160249 comprise the salts in the form of amorphous or crystalline inclusions with size smaller than 60 µm.

EP-A 1 567 596 discloses that coprecipitated graft copolymer mixtures can provide improved surface quality, where at least one graft copolymer is produced via redox initiation and at least one other graft copolymer is produced by persulfate initiation.

It is moreover desirable to obtain ABS molding compositions with minimized residual monomer content, in particular of acrylonitrile and/or styrene. The prior art describes various processes intended to reduce monomer content in the polymer. DE-A 10 2007 029 010 describes a process for the compounding of two polymers, for example ABS and polycarbonate, with use of an extruder with vent zones, where an inert entrainer is used. DE-A 38 40 293 describes a process for the removal of low-molecular-weight compounds from polymers, where an inert extraction gas is mixed with the polymer in an extruder. WO 2010/094416 is directed to a process for the production of a polymer composition, e.g. PC/ABS blend, with reduced content of volatile compounds, where the polymers comprising a certain water content are melted in an extruder with a specific vent zone. EP-A 1 415 693 describes a process where a mixture of polymer, residual monomers, oligomers and solvent is extruded via a plurality of dies into a devolatilization container.

It is disadvantageous that the processes described in the prior art for reducing residual monomer content often incur high apparatus cost, require use of an extraction gas, and require remelting of the polymer after production.

There is therefore a need for provision of a simple and inexpensive production process for ABS molding compositions where the resultant molding compositions have not only the known good mechanical properties but also improved surface quality, and preferably improved stability of surface homogeneity in respect of a hot moist environment. Residual monomer content in the ABS graft copolymer, and therefore in the ABS molding composition, is moreover to be reduced, without any requirement for an additional extrusion step incurring apparatus cost. In particular, total residual monomer content in the ABS graft copolymer is to be reduced to a value smaller than or equal to 2 000 ppm, preferably smaller than or equal to 1 000 ppm, based in each case on the dry ABS graft copolymer.

Surprisingly, it has been found that particularly advantageous ABS molding compositions are obtained if the drying of the ABS graft copolymer (graft rubber) takes place in a fluidized-bed drier or a pneumatic drier (also termed flash drier), or uses a combination of a fluidized-bed drier with a pneumatic drier. In particular, it has been found that rapid and uniform drying—of the type that can be achieved in a fluidized-bed drier or pneumatic drier with suitable temperatures and residence times—has an advantageous effect on the surface quality of the ABS molding compositions and moldings produced therefrom. Surprisingly, the process of the invention can in particular provide, in a simple manner, ABS molding compositions with a minimized number of, and/or minimized size of, salt inclusions.

Surprisingly, it has moreover been found that the drying described for the graft copolymer can significantly reduce residual monomer content, in particular content of acrylonitrile, 4-vinylcyclohexene and styrene. The ABS molding compositions produced by means of the process of the invention therefore feature very low residual monomer content, without any requirement for an additional extrusion step and/or devolatilization step. In particular, ABS graft copolymers can be obtained with residual monomer contents smaller than or equal to 2 000 ppm, in particular smaller than or equal to 1 000 ppm, based in each case on the dry graft copolymer. In particular, it has been found that residual monomer content can be significantly lowered if, after 2% by weight water content has been reached, in particular after 1% by weight water content has been reached, drying is continued for from 5 to 40 min. In particular, there is no adverse effect here on the other properties of the ABS molding compositions, e.g. mechanical properties and surface properties.

Fluidized-bed driers are devices which are operated batchwise or continuously, in particular continuously. Fluidized-bed driers are described by way of example in Krischer/Kröll, Trocknungstechnik [Drying Technology] (Zweiter Band, Trockner und Trocknungsverfahren [Second volume, Driers and drying processes], Springer-Verlag, 1959, pp. 275-282). Use of fluidized-bed driers having one or more heat exchangers integrated into the fluidized bed is moreover known. Use of heat exchangers can in particular introduce the required drying energy into the fluidized bed. These fluidized-bed driers are described by way of example in D. Gehrmann, et al., Trocknungstechnik in der Lebensmittelindustrie [Drying technology in the food industry] (Behr's Verlag GmbH & Co. KG, 1st edn. 2009, section 2.5.3 Statische Wirbelschichttrockner [Static fluidized-bed driers], pp. 143-145).

Pneumatic driers or flash driers are devices which in particular are operated continuously. They are described by way of example in Krischer/Kröll, Trocknungstechnik [Drying Technology] (Zweiter Band, Trockner und Trocknungsverfahren [Second volume, Driers and drying processes], by K. Kröll, Springer-Verlag, 1959, pp. 282 ff). The publication Yongchun Z. et al. (Explosion Risk Management of ABS Powder Processes, Proceedings of the 8th International Conference on Measurement and Control of Granular Materials (MCGM), 2009) describes the safety problems associated with drying of ABS in fluidized-bed driers.

The invention provides a process for the production of a thermoplastic molding composition comprising:

A: from 5 to 95% by weight, preferably from 40 to 80% by weight, of at least one thermoplastic copolymer A produced from:

A1: from 50 to 95% by weight, preferably from 65 to 80% by weight, particularly preferably from 69 to 80% by weight, based on the copolymer A, of a monomer A1 selected from styrene, α-methylstyrene and mixtures of styrene and at least one other monomer selected from α-methylstyrene, p-methylstyrene and $C_1$-$C_8$-alkyl (meth)acrylate (e.g. methyl methacrylate, ethyl methacrylate, n-butyl acrylate, tert-butyl acrylate), A2: from 5 to 50% by weight, preferably from 20 to 35% by weight, particularly preferably from 20 to 31% by weight, based on the copolymer A, of a monomer A2 selected from acrylonitrile and mixtures of acrylonitrile and at least one other monomer selected from methacrylonitrile, anhydrides of unsaturated carboxylic acids (e.g. maleic anhydride, phthalic anhydride) and imides of unsaturated carboxylic acids (e.g. N-substituted maleimides, for example N-cyclohexylmaleimide and N-phenylmaleimide), B: from 5 to 95% by weight, preferably from 20 to 60% by weight, of at least one graft copolymer B comprising:

B1: from 40 to 85% by weight, preferably from 50 to 80% by weight, particularly preferably from 55 to 70% by weight, based on the graft copolymer B, of at least one graft base B1 which is obtained via emulsion polymerization of:

B11: from 50 to 100% by weight, preferably from 80 to 100% by weight, based on the graft base B1, of butadiene, B12: from 0 to 50% by weight, preferably from 0 to 20% by weight, particularly preferably from 0 to 10% by weight, based on the graft base B1, of at least one other monomer B12 selected from styrene, α-methylstyrene, acrylonitrile, methacrylonitrile, isoprene, chloroprene, $C_1$-$C_4$-alkylstyrene, $C_1$-$C_8$-alkyl (meth)acrylate, alkylene glycol di(meth)acrylate and divinylbenzene;
where the total quantity of B11+B12 is exactly 100% by weight; and B2: from 15 to 60% by weight, preferably from 20 to 50% by weight, particularly preferably from 30 to 45% by weight, based on the graft copolymer B, of a graft shell B2 which is obtained via emulsion polymerization in the presence of the at least one graft base B1 of:

B21 from 50 to 95% by weight, preferably from 65 to 80% by weight, particularly preferably from 75 to 80% by weight, based on the graft shell B2, of a monomer B21 selected from styrene and mixtures of styrene and at least one other monomer selected from α-methylstyrene, p-methylstyrene and $C_1$-$C_8$-alkyl (meth)acrylate (e.g. methyl methacrylate, ethyl methacrylate, n-butyl acrylate, tert-butyl acrylate);

B22 from 5 to 50% by weight, preferably from 20 to 35% by weight, particularly preferably from 20 to 25% by weight, based on the graft shell B2, of a monomer B22 selected from acrylonitrile and mixtures of acrylonitrile and at least one other monomer selected from methacrylonitrile, anhydrides of unsaturated carboxylic acids (e.g. maleic anhydride, phthalic anhydride) and imides of unsaturated carboxylic acids (e.g. N-substituted maleimides, for example N-cyclohexylmaleimide and N-phenylmaleimide);

where the total quantity of graft base B1 and graft shell B2 is exactly 100% by weight; and K: from 0 to 90% by weight, preferably from 0 to 40% by weight, particularly preferably from 0 to 5% by weight, often from 0.1 to 5% by weight, of at least one other component K,
comprising the following steps:

a) precipitation of the at least one graft copolymer B after the emulsion polymerization reaction via addition of a precipitation solution comprising at least one salt and/or at least one inorganic acid;

b) mechanical dewatering of the precipitated graft copolymer B, preferably by means of centrifuging and/or filtration, where a graft copolymer B with water content smaller than or equal to 50% by weight is obtained;

c) drying of the dewatered graft copolymer B with use of a drying gas, where the graft copolymer B is caused to move in the drying gas and the temperature of the drying gas is in the range from 50 to 160° C.;

d) mixing of the thermoplastic copolymer A, of the dried graft copolymer B, and optionally of the other component(s) K.

It is preferable that the process described above comprises, as step a):

a) precipitation of the at least one graft copolymer B after the emulsion polymerization reaction via addition of a precipitation solution comprising at least one salt.

A particular feature of the molding compositions obtained by means of the process of the invention is that after storage of the molding composition or of the moldings produced therefrom under hot moist environmental conditions, the number of surface defects present, in particular caused by salt inclusions (known as salt specks) is significantly smaller or zero. It is particularly preferable that after storage under hot moist environmental conditions the thermoplastic ABS molding compositions produced by the process of the invention or moldings produced therefrom have less than 15, preferably less than 10, particularly preferably less than 5, surface defects on 150 cm$^2$ of surface. The other properties of the ABS molding compositions obtained by the process of the invention, e.g. mechanical properties, are not adversely affected.

The invention also provides the use of a fluidized-bed drier and/or of a pneumatic drier (flash drier) in the production of a thermoplastic ABS molding composition as described above for the drying of the graft copolymer B described in more detail below in order to improve the surface quality of the thermoplastic ABS molding composition and of the molding produced therefrom. In particular, the inventive use provides improved surface quality, where the surface of the thermoplastic molding composition, and of the molding produced therefrom, undergoes no disadvantageous change during storage under hot moist environmental conditions.

For the purposes of the present invention, ABS molding compositions are molding compositions comprising at least 10% by weight, preferably at least 60% by weight, particularly preferably at least 95% by weight, of the thermoplastic copolymer A and of the graft copolymer B (in total) as described above. It is preferable that the ABS molding composition comprises exclusively the thermoplastic copolymer A and the graft polymer B as polymeric components. For the purposes of the present invention, the expression ABS molding compositions also covers polymer blends comprising the thermoplastic copolymer A and the graft copolymer B as described above and at least one rubber-free thermoplastic resin not composed of vinyl monomers, for example a polycondensate, preferably selected from polycarbonates, polyester carbonates, polyesters and polyamides.

For the purposes of the present invention, the word (meth)acrylic or (meth)acrylate, for example in the name (meth)acrylic acid or $C_1$-$C_8$-alkyl (meth)acrylate, can denote the corresponding acrylic/acrylate and/or methacrylic/methacrylate compounds.

The present invention moreover provides thermoplastic molding compositions which can be produced by the process of the invention described below, and moldings produced from the molding composition of the invention.

Thermoplastic Copolymer A

It is preferable that the thermoplastic copolymer A is a rubber-free copolymer A. In a preferred embodiment, monomer A1 is styrene or α-methylstyrene and monomer A2 is acrylonitrile. In an embodiment to which preference is further given, monomer A1 is a mixture of styrene and α-methylstyrene and monomer A2 is acrylonitrile.

It is preferable that the mixture described for monomer A1 comprises at least 10% by weight of styrene, preferably at least 50% by weight and particularly preferably at least 90% by weight.

It is in particular preferable that the thermoplastic copolymer A is produced from (or consists of):

from 50 to 95% by weight, preferably from 65 to 80% by weight, particularly preferably from 69 to 80% by weight, with particular preference from 71 to 80% by weight, based on the copolymer A, of the monomer A1 selected from styrene, α-methylstyrene and mixtures of styrene and α-methylstyrene, and from 5 to 50% by weight, preferably from 20 to 35% by weight, particularly preferably from 20 to 31% by weight, with particular preference from 20 to 29% by weight, based on the copolymer A, of a monomer A2 selected from acrylonitrile and mixtures of acrylonitrile and methacrylonitrile.

Particular preference is given to a thermoplastic copolymer A comprising a quantity of acrylonitrile that is less than or equal to 30% by weight, based on the entire copolymer A.

The thermoplastic copolymer A preferably has average molar masses $M_w$ in the range from 20 000 to 200 000 g/mol. It is preferable that the thermoplastic copolymer A has intrinsic viscosities [η] in the range from 20 to 110 ml/g (measured in dimethylformamide at 25° C.). Details concerning the production of the thermoplastic copolymer A are described by way of example in DE-A 24 20 358 and DE-A 27 24 360. Suitable thermoplastic copolymers A are likewise also described in DE-A 1 971 3509. The thermoplastic copolymers can be produced either via purely thermal initiation or via addition of initiators, in particular of peroxides. Suitable thermoplastic copolymers A can preferably be produced by bulk polymerization or solution polymerization.

Graft Copolymer B

It is preferable that the graft copolymer B is a polybutadiene graft rubber. The at least one graft copolymer B is produced from (or consists of):

from 40 to 85% by weight, preferably from 50 to 80% by weight, particularly preferably from 55 to 70% by weight, based on the graft copolymer B, of at least one graft base B1, and from 15 to 60% by weight, preferably from 20 to 50% by weight, particularly preferably from 30 to 45% by weight, based on the graft copolymer B, of a graft shell B2 which is obtained via emulsion polymerization of the monomers B21 and B22 in the presence of the at least one graft base B1, where the total quantity of graft base B1 and graft shell B2 is exactly 100% by weight. It is preferable that the total quantity of B11+B12 is exactly 100% by weight.

In a preferred embodiment, the at least one graft base B1 is obtained via emulsion polymerization of:

B11: from 50 to 100% by weight, preferably from 80 to 100% by weight, based on the graft base B1, of butadiene, B12: from 0 to 50% by weight, preferably from 0 to 20% by weight, particularly preferably from 0 to 10% by weight, based on the graft base B1, of at least one other monomer B12 selected from styrene and acrylonitrile; where the total quantity of B11+B12 is exactly 100% by weight.

It is preferable that the at least one graft base B1 is obtained via emulsion polymerization of butadiene alone. In another embodiment, the at least one graft base B1 is obtained via emulsion polymerization of:

B11: from 50 to 99% by weight, preferably from 80 to 95% by weight, based on the graft base B1, of butadiene, B12: from 1 to 50% by weight, preferably from 5 to 20% by weight, particularly preferably from 5 to 10% by weight, based on the graft base B1, of at least one other monomer B12 selected from styrene and acrylonitrile; where the total quantity of B11+B12 is exactly 100% by weight.

It is preferable that the monomer B21 is styrene or a mixture of styrene and at least one other monomer selected from α-methylstyrene, methyl methacrylate, ethyl methacrylate, n-butyl acrylate and tert-butyl acrylate, particularly preferably styrene or a mixture of styrene and at least one other monomer selected from α-methylstyrene and methyl methacrylate.

It is preferable that the monomer B22 is acrylonitrile or a mixture of acrylonitrile and at least one other monomer selected from methacrylonitrile, maleic anhydride, N-cyclohexylmaleimide and N-phenylmaleimide, particularly preferably acrylonitrile or a mixture of acrylonitrile and at least one other monomer selected from methacrylonitrile and maleic anhydride.

In a particularly preferred embodiment, the monomer B21 is styrene and the monomer B22 is acrylonitrile.

In a preferred embodiment, the median particle diameter $d_{50}$ of the graft base B1 is in the range from 100 to 1000 nm.

In a preferred embodiment, the gel content of the graft base B1 is in the range from 30 to 95% by weight.

The median particle diameter $d_{50}$ is typically determined by ultracentrifuge measurement as described by way of example in W. Scholtan, H. Lange (Kolloid Z. u. Z. Polymere 250, pp. 782 to 796 (1972)).

The gel content values stated relate to determination by the wire cage method in toluene, as described by way of example in Houben-Weyl (Methoden der Organischen Chemie, Makromolekulare Stoffe, Teil 1 [Methods of organic chemistry, Macromolecular substances, Part 1], p. 307 (1961), Thieme Verlag Stuttgart).

Gel contents of the at least one graft base B1 (polybutadiene lattices), in particular of the various graft bases B1-A, B1-B, B1-C and B1-D, as described below, can typically in principle be adjusted in a known manner via use of suitable reaction conditions. By way of example, a high reaction temperature and/or conduct of the polymerization reaction to high conversion, and also optionally addition of crosslinking substances, usually lead to high gel content. By way of example, low reaction temperature and/or termination of the polymerization reaction before onset of any major crosslinking, and also optionally addition of molecular-weight regulators (for example n-dodecyl mercaptan or tert-dodecyl mercaptan) usually lead to low gel content.

It is preferable that the at least one graft base B1, and in particular the various graft bases B1-A, B1-B, B1-C and B1-D as described below, is/are produced via emulsion polymerization of butadiene as monomer B11 by what is known as the seed polymerization method. This typically begins by producing a fine-particle latex, preferably a polybutadiene latex, as seed latex, and then continues polymerization via addition of further monomers comprising or consisting of butadiene, to give larger latex particles. This is described by way of example in Houben-Weyl (Methoden der Organischen Chemie, Makromolekulare Stoffe, Teil 1 [Methods of organic chemistry, Macromolecular substances, Part 1], p. 339 (1961), Thieme Verlag Stuttgart). A seed-batch process can preferably be used here, or a seed-feed process.

Seed lattices used are preferably butadiene polymers, e.g. polybutadiene, butadiene/styrene copolymers or butadiene/acrylonitrile copolymers. In principle it is also possible to use other fine-particle lattices comprising or consisting of the monomers B12; by way of example, it is possible to use seed lattices made of polystyrene or of styrene copolymers, polymethyl methacrylate or methyl methacrylate copolymers. It is preferable to use pure polybutadiene lattices as seed lattices in the production of the graft base B1, and in particular in the production of the graft bases B1-A, B1-B, B1-C and B1-D.

In a preferred embodiment, the process of the invention comprises the production of at least two different graft copolymers B from at least two different graft bases B1, where the graft bases B1 differ via their median particle diameter $d_{50}$.

It is preferable to use one or more of the graft bases B1-A, B1-B, B1-C and B1-D described below.

It is preferable that the graft copolymer B is a mixture of at least two, preferably precisely two, graft copolymers B-I and B-II, where graft copolymer B-I is obtained via emulsion polymerization of a mixture of the monomers B21 and B22 in the presence of a graft base B1-A which has a median particle diameter $d_{50}$ in the range from 230 to 330 nm, preferably from 240 to 320 nm, particularly preferably from 250 to 310 nm, and of a graft base B1-B which has a median particle diameter $d_{50}$ in the range from 340 to 480 nm, preferably from 350 to 470 nm, particularly preferably from 360 to 460 nm;

and graft copolymer B-II is obtained via emulsion polymerization of a mixture of the monomers B21 and B22 in the presence of a graft base B1-C which has a median particle diameter $d_{50}$ in the range from 10 to 220 nm, preferably from 20 to 210 nm, particularly preferably from 30 to 200 nm.

It is preferable that the graft bases B1-A, B1-B, B1-C and/or B1-D, preferably the graft bases B1-A and B1-B, are produced with use of a seed latex with median particle diameter $d_{50}$ in the range from 10 to 220 nm, preferably from 20 to 210 nm and particularly preferably from 30 to 200 nm. If seed lattices with median particle diameters $d_{50}$ above 80 nm, preferably above 90 nm and particularly preferably above 100 nm are used, it is also preferable that the seed lattices themselves are produced via seed polymerization. It is preferable here to use seed lattices (B1-D) with median particle diameter $d_{50}$ in the range from 10 to 60 nm, preferably from 20 to 50 nm. It is preferable that the graft base B1-C is produced with use of a seed latex B1-D with median particle diameter $d_{50}$ in the range from 10 to 60 nm, preferably from 20 to 50 nm. In a preferred embodiment, the graft copolymer B-I is obtained via emulsion polymerization in the presence of the graft bases B1-A and/or B1-B, where the graft bases B1-A and/or B1-B are produced with use of the graft base B1-C as seed latex. In a preferred embodiment, the graft copolymer B-II is obtained via emulsion polymerization in the presence of the graft base B1-C, where B1-C serves as seed latex for the production of the graft bases B1-A and/or B1-B.

The ratio by weight of the graft copolymers B-I and B-II can be varied widely. It is preferable that the graft copolymer is a mixture of the graft copolymers B-I and B-II, where the ratio by weight of graft copolymer B-I to graft copolymer B-II is in the range from 90:10 to 10:90, preferably from 80:20 to 20:80 and particularly preferably from 70:30 to 35:65.

Graft copolymer B-I is obtained via emulsion polymerization of a mixture of the monomers B21 and B22 in the presence of a graft base B1-A which has a median particle diameter $d_{50}$ in the range from 230 to 330 nm, preferably from 240 to 320 nm, particularly preferably from 250 to 310 nm, and of a graft base B1-B which has a median particle diameter $d_{50}$ in the range from 340 to 480 nm, preferably from 350 to 470 nm, particularly preferably from 360 to 460 nm. The ratio by weight of the solids of the graft bases B1-A and B1-B in the emulsion polymerization of the graft copolymer B-I can be varied widely. The solids ratio by weight of B1-A to B1-B is typically in the range from 90:10 to 10:90, preferably from 80:20 to 20:80, particularly preferably from 70:30 to 30:70 and very particularly preferably from 60:40 to 40:60. The solids contents of the graft bases B1 (butadiene lattices) are typically determined gravimetrically via drying at 180° C. for 23 minutes in a convection oven or by means of a drying and weighing device.

It is preferable that the median particle diameter $d_{50}$ of the graft base B1-A is in the range from 230 to 330 nm, with preference from 240 to 320 nm and particularly preferably from 250 to 310 nm, its gel content being in the range from 30 to 80% by weight, preferably from 40 to 75% by weight and particularly preferably from 45 to 70% by weight.

It is preferable that the median particle diameter $d_{50}$ of the graft base B1-B is in the range from 340 to 480 nm, preferably from 350 to 470 nm and particularly preferably from 360 to 460 nm, its gel content being in the range from 50 to 95% by weight, preferably from 55 to 90% by weight and particularly preferably from 60 to 85% by weight.

It is preferable that the median particle diameter $d_{50}$ of the graft base B1-C is in the range from 10 to 220 nm, preferably from 20 to 210 nm and particularly preferably from 30 to 200 nm, its gel content being in the range from 30 to 98% by weight, preferably from 40 to 95% by weight and particularly preferably from 50 to 92% by weight.

The seed latex B1-D is preferably a pure butadiene latex. It is preferable that the median particle diameter $d_{50}$ of B1-D is in the range from 10 to 60 nm, preferably from 20 to 50 nm, and that its gel content is in the range from 10 to 95% by weight, preferably from 20 to 90% by weight and particularly preferably from 30 to 85% by weight.

The monomers used in the emulsion polymerization of the graft copolymer B are preferably mixtures of styrene and acrylonitrile in a ratio by weight of from 95:5 to 50:50, particularly preferably in a ratio by weight of from 80:20 to 65:35.

It is additionally possible in the production of the graft base B1 and/or in the emulsion polymerization of the at least one graft copolymer B to use molecular weight regulators, preferably in quantities of from 0.01 to 2% by weight, particularly preferably in quantities of from 0.05 to 1% by weight (based in each case on the entire quantity of monomer in the emulsion polymerization). Examples of suitable molecular weight regulators are alkyl mercaptans, for example n-dodecyl mercaptan, tert-dodecyl mercaptan, dimeric α-methylstyrene and terpinols.

Initiators used in the production of the graft base B1 and/or in the emulsion polymerization of the at least one graft copolymer B can be any desired initiators. It is preferable to use at least one organic and/or inorganic peroxide compound (comprising at least one peroxide group R—O—O—H and/or R—O—O—R) as initiator, e.g. hydrogen peroxide, cumene hydroperoxide, tert-butyl hydroperoxide, p-methane hydroperoxide, ammonium persulfate, potassium persulfate or sodium persulfate. In particular, inorganic peroxide salts are used, examples being peroxodisulfates (persulfates), perphosphates and perborates of ammonium, sodium or potassium. Particular preference is given to sodium persulfates and potassium persulfates.

In a preferred embodiment, an inorganic peroxide salt, in particular an inorganic peroxodisulfate salt, preferably sodium peroxodisulfate and/or potassium peroxodisulfate, is used in the emulsion polymerization of the graft copolymer B.

Emulsifier used in the production of the graft base B1 and/or in the emulsion polymerization to produce the at least one graft copolymer B can typically comprise conventional anionic emulsifiers. Preference is given to use of the following as emulsifiers: alkyl sulfates, alkylsulfonates, aralkylsulfonates, soaps of saturated or unsaturated fatty acids, and also alkaline disproportionated or hydrogenated abiatic or tall oil acids or a mixture thereof. It is preferable to use emulsifiers having carboxy groups (e.g. disproportionated abiatic acid, salts of $C_{10}$-$C_{18}$-fatty acids, emulsifiers of DE-A 36 39 904 and DE-A 39 13 509).

In another preferred embodiment, emulsifiers used can comprise alkaline soaps of sodium salts and potassium salts of disproportionated and/or dehydrogenated and/or hydrogenated and/or partially hydrogenated resins (rosin) with at least 30% by weight content of dehydroabiatic acid and with at most 1% by weight content of abiatic acid.

It is moreover possible in the emulsion polymerization of the graft base B1 to use salts, acids and bases, e.g. sulfuric acid, phosphoric acid, solutions of sodium hydroxide, potassium hydroxide, sodium salts and potassium salts of sulfates and of phosphates, and in particular tetrasodium pyrophosphate can be used.

The polymerization temperature in the emulsion polymerization of the graft copolymer B is generally from 25 to 160° C., preferably from 40 to 90° C. Suitable emulsifiers have been mentioned above. Conventional temperature control, e.g. isothermal, can be used here; however, conduct of the graft polymerization reaction is preferably such that the temperature difference between start and end of the reaction is at least 10° C., preferably at least 15° C. and particularly preferably at least 20° C.

Production of the graft copolymer B, in particular of the graft copolymers B-I and B-II, is achieved in the invention by means of emulsion polymerization. Familiar embodiments of the emulsion polymerization reaction, in batch operation or in continuous operation, are known to the person skilled in the art.

In particular, the monomers of the graft shell B2, i.e. the monomers B21 and B22, separately or in the form of monomer mixture, are continuously added to the graft base B2 in the given quantities and ratios, and polymerized. The monomers here are typically added to the graft base B1 in a manner known to the person skilled in the art.

In the production of the graft copolymer B-I, the monomers of the graft shell B2, i.e. the monomers B21 and B22, separately or in the form of monomer mixture, are continuously added to a mixture of the graft bases B1-A and B1-B, and polymerized.

In the production of the graft copolymer B-II, the monomers of the graft shell B2, i.e. the monomers B21 and B22, separately or in the form of monomer mixture, are continuously added to the graft base B1-C, and polymerized.

For the production of the graft copolymer B, conduct of the monomer feed during the emulsion polymerization reaction can preferably be such that within the first half of the entire feed time of the monomers from 55 to 90% by weight, preferably from 60 to 80% by weight and particularly preferably from 65 to 75% by weight, of the entire quantity of monomers used during the emulsion polymerization reaction, in particular of the monomers B21 and B22, are metered into the mixture, the remaining proportion of the monomers being metered into the mixture within the second half of the total feed time.

In a preferred embodiment, a graft copolymer B as described in WO 2012/022710 can be used. The graft copolymers described in WO 2012/022710 are in particular produced via emulsion polymerization of styrene and acrylonitrile in a ratio by weight of from 95:5 to 50:50 in the presence of at least one graft base B1-E (e.g. agglomerated polybutadiene lattices A11, A12, A13, A51, A52, A53, A54, A61 and A62 in WO 2012/022710), where the median particle diameter $d_{50}$ of the graft base B1-E obtain is from 200 to 800 nm, preferably from 225 to 650 nm and particularly preferably from 250 to 600 nm. The graft base B1-E is typically obtained via agglomeration of fine-particle polybutadiene seed lattices (e.g. fine-particle polybutadiene lattices B1 and B6 in WO 2012/022710) with acetic anhydride as in WO 2012/022710. The median particle diameter $d_{50}$ of the fine-particle polybutadiene seed lattices is typically smaller than 110 nm. They are produced via emulsion polymerization of butadiene, where up to 50% by weight, based on the entire quantity of the monomers, can be replaced by one or more monomers copolymerizable with butadiene. Examples of these are: isoprene, chloroprene, acrylonitrile, styrene, alpha-methylstyrene, $C_1$-$C_4$-alkylstyrenes, $C_1$-$C_8$-alkyl acrylates, $C_1$-$C_8$-alkyl methacrylates.

The quantity of acetic anhydride to be used in this embodiment is preferably from 0.1 to 5 parts, based on 100 parts of the solids of the fine-particle polybutadiene seed latex. It is preferable that the fine-particle polybutadiene seed latex is mixed with acetic anhydride and, after complete agglomeration has been achieved, stabilized by a basic solution, preferably a solution of potassium hydroxide. Further details relating to the agglomeration procedure can be found in WO 2012/022710. Emulsifiers, initiators and molecular weight regulators, bases, acids and salts can be used as described above and as described in WO 2012/022710.

The agglomerated polybutadiene seed latex (graft base B1-E) is grafted with styrene and acrylonitrile, and it is preferable here to polymerize from 15 to 60% by weight of a mixture of styrene and acrylonitrile and optionally of other monomers in the presence of from 40 to 85% by weight of the graft base B1-E (calculated as latex solids). Up to 50% by weight, based on the entirety of the monomers used in the grafting reaction, can be replaced by other monomers such as alpha-methylstyrene, methyl methacrylate, maleic anhydride and N-phenylmaleinimide. Further details relating to grafting of the graft base B1-E can be found in WO 2012/022710.

In another preferred embodiment, a graft copolymer B as described in WO 2014/170407 can be used. The graft copolymers described in WO 2014/170407 are in particular produced via emulsion polymerization of styrene and acrylonitrile in a ratio by weight of from 70:30 to 90:10 in the presence of at least one graft base B1-F (e.g. agglomerated graft base B1-1, pages 30 and 31 of WO 2014/170407), where the graft base B1-F has a bimodal particle size distribution with a fraction of unagglomerated latex particles with median particle diameter $d_{50}$ in the range from 80 to 120 nm and a fraction of agglomerated latex particles with median particle diameter $d_{50}$ in the range from 350 to 550 nm and polydispersity U smaller than 0.28. The graft base B1-F is typically obtained via agglomeration of fine-particle polybutadiene seed lattices (e.g. graft base B1, page 27 of WO 2014/170407) by an agglomerating acrylate copolymer (e.g. copolymer C-1, page 28 of WO 2014/170407). The fine-particle polybutadiene seed lattices typically have a median particle diameter $d_{50}$ in the range from 80 to 110 nm, and are produced via emulsion polymerization of butadiene, where up to 10% by weight, based on the total quantity of the monomers, can be replaced by a vinylaromatic, e.g. styrene, alpha-methylstyrene, $C_1$-$C_4$-alkylstyrenes. In this embodiment, the graft base B1-F (agglomerated graft base B1 in WO 2014/170407) is grafted with styrene and acrylonitrile, and it is preferable here that from 15 to 60% by weight of a mixture of styrene and acrylonitrile and optionally of other monomers are polymerized in the presence of from 40 to 85% by weight of the graft base B1-F (calculated as latex solids).

Details concerning the agglomerating copolymer and the production of the graft copolymer based on the graft base B1-F can be found in WO 2014/170407 (in particular production process of page 31 of WO 2014/170407).

Other Components K

During production, work-up, further processing and final shaping of the molding compositions of the invention, additives that are necessary or advantageous can be added, examples being antioxidants, UV stabilizers, peroxide-decomposing substances, antistatic agents, lubricants, mold-release agents, flame retardants, fillers and reinforcing materials (glass fibers, carbon fibers, etc.), colorants.

In order to protect the graft copolymers B from thermal degradation during work-up, and in order to permit reliable and risk-free work-up, it is advisable to add, to the graft copolymers B, and mix by stirring, antioxidants, e.g. one or more phenolic antioxidants, and also any desired other substances, which increase the thermal stability of the graft copolymers, in the form of one or more emulsions or dispersions.

The thermoplastic molding compositions can comprise not only the polymer components A and B mentioned but also, as other component K, rubber-free thermoplastic resins not composed of vinyl monomers. These thermoplastic resins are in particular polycondensates, e.g. aromatic polycarbonates, aromatic polyester carbonates, polyesters and polyamides. Suitable thermoplastic polycarbonates and polyester carbonates are known and are described by way of example in DE-A 14 95 626, DE-A 22 32 877, DE-A 27 03 376, DE-A 27 14 544, DE-A 30 00 610, DE-A 38 32 396, DE-A 30 77 934, and also in particular in DE-A 100 08 420 and EP-A 2 606 073.

In one embodiment, the thermoplastic molding composition is an ABS blend comprising from 1 to 90% by weight, preferably from 10 to 87.5% by weight, particularly preferably from 20 to 50% by weight, based on the entire thermoplastic molding composition, of at least one rubber-free thermoplastic resin which is not composed of vinyl monomers and which is preferably selected from polycarbonates and polyamides.

In a preferred embodiment, after separate production of the graft copolymers B-I and B-II described above, these are mixed and precipitated together (coprecipitated) (step a)).

Another possibility, alongside the above, is, after the separate production of the graft copolymers B-I and B-II described above, to work these up separately, i.e. to conduct the steps a) to c) (precipitation of the graft copolymers, dewatering of the water-moist graft copolymers, preferably by filtration or centrifugation, and drying, preferably with use of a fluidized-bed drier and/or of a pneumatic drier) separately, and to mix the worked-up graft copolymers B-I and B-II in step d) with the thermoplastic copolymer A and optionally with other components K.

Step a)

The step a) of the invention comprises the precipitation of the at least one graft copolymer B after the emulsion polymerization reaction via addition of a precipitation solution comprising at least one salt and/or at least one inorganic acid.

The step a) of the invention preferably comprises the precipitation of the at least one graft copolymer B after the emulsion polymerization reaction via addition of a precipitation solution comprising at least one salt.

The step a) of the invention preferably comprises the precipitation of the at least one graft copolymer B after the emulsion polymerization reaction via addition of a precipitation solution comprising at least one inorganic acid.

In a preferred embodiment, the step a) of the invention comprises mixing of the graft copolymers B-I and B-II and precipitation of the mixture of the graft copolymers via addition of the precipitation solution comprising at least one salt. In particular here, the graft copolymers B-I and B-II are respectively homogeneously mixed in their latex form after the emulsion polymerization reaction. Further work-up of the resultant latex mixture of the graft copolymers B-I and B-II is achieved as described in the steps b) to d).

The precipitation solution used for the precipitation of the at least one graft copolymer B after the emulsion polymerization reaction can in particular comprise aqueous salt solutions, for example aqueous solutions of magnesium sulfate, kieserite, pentahydrite, hexahydrite, epsomite (Epsom salt), calcium chloride, sodium chloride or a mixture thereof. It is preferably also possible to use an aqueous acid solution as precipitation solution, in particular sulfuric acid, in particular a sulfuric acid with a concentration in the range from 1 to 20% by weight, preferably from 2 to 20% by weight. It is preferably also possible to use mixtures of aqueous salt solutions and acids (e.g. sulfuric acid, acetic acid) as precipitation solution.

Preferred salts here are magnesium sulfate, kieserite (Mg[$SO_4$].$H_2O$), pentahydrite (Mg[$SO_4$].$5H_2O$), hexahydrite (Mg[$SO_4$].$6H_2O$), and epsomite (Mg[$SO_4$].$7H_2O$, Epsom salt), and preferred acids are sulfuric acid, acetic acid and mixtures thereof. It is particularly preferable that the precipitation of the at least one graft copolymer B in step a) is achieved via action of a combination of aqueous salt solutions and aqueous acid solutions.

It is very particularly preferable that the precipitation is achieved via action of a combination of an aqueous salt solution selected from aqueous solutions of magnesium sulfate, kieserite, pentahydrite, hexahydrite and epsomite (Epsom salt), and sulfuric acid.

The precipitation solutions typically have a concentration of salt and/or inorganic acid in the range from 2 to 20% by weight, based on the precipitation solution.

The precipitation solutions typically have a concentration of salt or salt and acid in the range from 2 to 20% by weight, based on the precipitation solution.

The precipitation of the at least one graft copolymer B in step a) can be achieved in one or more stages with addition of a plurality of precipitation solutions, where the precipitation solutions can be identical or different.

The precipitation of the at least one graft copolymer B can preferably be carried out via continuous or batchwise addition of the precipitation solution. In the case of the continuous addition, the precipitation takes place in at least one continuously operated stirred vessel, preferably in at least two, particularly preferably in at least three, and very particularly preferably in at least four, continuously operated stirred vessels, for example continuous stirred tanks.

In a particularly preferred embodiment, an aqueous magnesium sulfate solution and a sulfuric acid (5 to 20% by weight) are metered continuously and simultaneously in one or more stages into the graft copolymer B (latex).

The precipitation can be carried out in a temperature range from 20 to 150° C.; preferably from 40 to 100° C., particularly preferably from 45 to 99° C.

Step b)

The step b) of the invention comprises the mechanical dewatering of the precipitated graft copolymer B, preferably by means of centrifuging and/or filtration, giving a graft copolymer B with water content less than or equal to 50% by weight.

The water content (also termed residual moisture content) is the content of water in percent by weight, based on the moist graft copolymer B. The water content is in particular determined with the aid of suitable analysis equipment (e.g. drying and weighing devices), where the sample is dried until constant weight of the sample has been achieved over a defined period. By way of example, the water content of the graft copolymer B can be determined in a Halogen Moisture Analyzer HR73 from Mettler Toledo at 180° C. until constant weight has been achieved for 30 seconds.

The mechanical dewatering of the precipitated graft copolymer B is preferably achieved by means of centrifuging. The precipitated graft copolymer is typically centrifuged with a centripetal acceleration of from 200 to 1000 g, preferably from 300 to 800 g, for a period of from 1 second to 5 minutes, preferably from 1 to 120 seconds.

It is preferable that in step b) or in a downstream washing step as described below a graft copolymer B is obtained with water content in the range from 10 to 50% by weight, preferably from 20 to 40% by weight, with particular preference from 25 to 35% by weight. It is more preferable that a graft copolymer B is obtained with water content in the range from 10 to 30% by weight, preferably from 10 to 25% by weight, with particular preference from 15 to 20% by weight.

In another embodiment, the mechanical dewatering of the graft copolymer B is followed by a wash step, where the dewatered graft copolymer B is preferably treated with water or with a mixture of water and a polar, water-miscible organic solvent. The water or the mixture is preferably removed by filtration or centrifuging after the treatment. This preferably gives a graft copolymer B with water content less than or equal to 50% by weight. It is preferable that after the optional wash step the graft copolymer B has a water content stated above.

Step c)

The step c) of the invention comprises the drying of the dewatered graft copolymer B with water content less than or equal to 50% by weight with use of a drying gas, where the graft copolymer B is caused to move in the drying gas and the temperature of the drying gas is in the range from 50 to 160° C., preferably from 55 to 155° C., particularly preferably from 60 to 150° C.

In particular, the graft copolymer B is caused to move together with the current of drying gas, and in particular the graft copolymer B is entrained by the current of drying gas.

Drying gas used preferably comprises air, nitrogen or any desired mixture thereof.

In a preferred embodiment, the drying of the dewatered graft copolymer B in step c) is achieved with use of a fluidized-bed drier and/or of a pneumatic drier (flash drier). It is preferable that the drying is achieved with use of a fluidized-bed drier or with use of a combination of a fluidized-bed drier and a pneumatic drier. In particular, the fluidized-bed drier can comprise one or more heat exchangers.

Fluidized-bed driers and pneumatic driers (flash driers) are known to the person skilled in the art. In particular, these are drying devices for flowable particulate materials of the type described in Krischer/Kröll, Trocknungstechnik [Drying Technology] (Zweiter Band, Trockner and Trocknungsverfahren [Second volume, Driers and drying processes], Springer-Verlag, 1959). Fluidized-bed driers are described by way of example on pages 275 to 282 of the abovementioned document. Pneumatic driers or flash driers as mentioned are described by way of example on page 282 in the abovementioned document.

In fluidized-bed driers, a gas, in particular hot air, or hot gases, preferably a drying gas selected from air and/or nitrogen, with a temperature in the range from 50 to 160° C., typically passes upward (i.e. against the direction of gravity) through, and lifts, but does not entrain, the material to be dried (i.e. the dewatered graft copolymer B with water content less than or equal to 50% by weight). This generally produces a layer in which the particles of the material to be dried are in constant upward and downward motion, resembling a bubbling liquid. The term fluidized bed or floatation bed is often used. The flow conditions of the respective system typically have to be adjusted to produce the desired fluidized layer. Fluidized-bed driers generally comprise a floatation chamber in which the material to be dried by way of example lies on a sieve plate through which the drying gas flows upward through the material, at least one input device for the (moist) material to be dried, and at least one collection and removal device (collector) for the dried material. By way of example, the dried particles, which by virtue of their decreasing weight are discharged upward out of the fluidized layer, can be removed by an appropriate device (e.g. a cyclone) from the gas stream.

In particular, the average residence time of the graft copolymer B in the fluidized-bed drier is from 1 to 60 min, preferably from 5 to 50 min, particularly preferably from 10 to 40 min.

In a preferred embodiment, the drying of the dewatered graft copolymer B in step c) is achieved with use of a fluidized-bed drier which comprises one or more heat exchangers integrated into the fluidized bed. Use of heat exchangers can in particular introduce drying energy into the fluidized bed—in addition to the drying energy of the hot drying gas. Familiar embodiments of heat exchangers, for example plate heat exchangers, ribbed-pipe heat exchangers, tube heat exchangers and spiral heat exchangers are known to the person skilled in the art and are described in standard works. It is possible by way of example to use fluidized-bed driers described in D. Gehrmann, et al., Trocknungstechnik in der Lebensmittelindustrie [Drying technology in the food industry] (Behr's Verlag GmbH & Co. KG, 1st edn. 2009, section 2.5.3 Statische Wirbelschichttrockner [Static fluidized-bed driers], pp. 143-145). The heat exchangers are preferably operated at temperatures in the range from 50 to 100° C., preferably from 55 to 90° C., particularly preferably from 60 to 85° C. In particular, the inlet temperature of the heat-exchange medium (for example water) is from 50 to 100° C., preferably from 55 to 90° C., particularly preferably from 60 to 85° C.

In pneumatic driers, a stream of gases, in particular warm air or hot gases, preferably a drying gas selected from air and/or nitrogen with a temperature in the range from 50 to 160° C., typically entrains and thus dries the material to be dried (i.e. the dewatered graft copolymer B with water content less than or equal to 50% by weight). The stream of gas here, as drying gas, transfers energy to the material to be dried and conducts the resultant water vapor away. Pneumatic driers typically take the form of horizontal or vertical pipes, typically comprising at least one input device for the (moist) material to be dried and at least one collection and removal device (collector) for the dried material.

The average residence time of the graft copolymer B in the pneumatic drier is typically from 1 to 300 seconds, preferably from 1 to 120 seconds, particularly preferably from 5 to 60 seconds.

In step c) it is possible to operate one or more fluidized-bed driers and/or one or more pneumatic driers batchwise or continuously.

The product temperature in the drying step c), i.e. the temperature of the at least one graft copolymer B in step c), is below 100° C., preferably below 95° C. and very particularly preferably below 90° C. It is preferable that the product temperature is in the range from 30 to 100° C., preferably from 40 to 95° C., particularly preferably from 60 to 90° C. This in particular means that the product temperature is within an abovementioned range during the entire drying step.

The average residence time of the graft copolymer B in the fluidized-bed drier and/or pneumatic drier is typically from 1 second to 90 min, preferably from 1 second to 60 min, preferably from 5 seconds to 40 min. In principle it is advantageous in the case of the pneumatic drier to set residence times that are shorter and temperatures that are higher than those for the fluidized-bed drier.

By virtue of the drying step of the invention it is in particular possible to achieve particularly rapid and uniform drying, and this in particular leads to small salt inclusions, for example in the form of salt crystals, which cause few surface defects visible to the naked eye. The drying step of the invention should therefore in particular ensure rapid and effective heat transfer between the drying gas and the graft copolymer B to be dried, while on the other hand, however, high temperatures of the actual graft copolymer B to be dried are avoided.

It is preferable that the drying in step c) is carried out by means of a drying gas selected from air and/or nitrogen,
  where the drying is carried out with use of a fluidized-bed drier and the temperature of the drying gas is in the range from 50 to 100° C., preferably from 55 to 90° C., particularly preferably from 60 to 85° C.;
  or where the drying is carried out with use of a pneumatic drier and the temperature of the drying gas is in the range from 100 to 160° C., preferably from 110 to 155° C., particularly preferably from 130 to 150° C.

It is more preferable that the drying in step c) is carried out by means of a drying gas selected from air and/or nitrogen,
  where the drying is carried out with use of a fluidized-bed drier which comprises one or more heat exchangers integrated into the fluidized bed; the temperature of the drying gas is in the range from 50 to 100° C., preferably from 55 to 90° C., particularly preferably from 60 to 85° C., and the heat exchanger is operated at temperatures in the range from 50 to 100° C., preferably from 55 to 90° C., particularly preferably from 60 to 85° C.

With particular preference, the drying in step c) is carried out by means of a drying gas selected from air and/or nitrogen,
  where the drying is carried out with use of a fluidized-bed drier, preferably a fluidized-bed drier which comprises one or more heat exchangers integrated into the fluidized bed, the temperature of the drying gas is in the range from 50 to 100° C., and the average residence time of the graft copolymer B in the fluidized-bed drier is from 1 to 90 min, preferably from 10 to 85 min, with particular preference from 15 to 80 min, more preferably from 1 to 60 min, more preferably from 5 to 50 min, particularly preferably from 10 to 40 min;
  or where the drying is carried out with use of a pneumatic drier, the temperature of the drying gas is in the range from 100 to 160° C. and the average residence time of the graft copolymer B in the pneumatic drier is from 1 to 300 seconds, preferably from 1 to 120 seconds, particularly preferably from 5 to 60 seconds.

In a preferred embodiment of the invention, the drying described above is continued for a further period of from 10 to 40 min, preferably from 15 to 30 min, from the juncture at which a water content of 2% by weight, preferably 1% by weight, with particular preference 0.8% by weight, is achieved.

In a preferred embodiment, the water content of the dried graft copolymer B obtained in step c) is in the range from 0.01 to 1% by weight, preferably from 0.05 to 0.8% by weight, with particular preference from 0.1 to 0.5% by weight, particularly preferably from 0.2 to 0.4% by weight.

By virtue of the drying step of the invention it is in particular possible to reduce the total residual monomer content, in particular the total content of styrene and 4-vinylcyclohexene, in the graft copolymer B to a value smaller than or equal to 2 000 ppm, in particular smaller than or equal to 1 000 ppm, preferably smaller than or equal to 500 ppm, based in each case on the dry graft copolymer B.

The styrene content in the graft copolymer B is preferably reduced to a value smaller than 1 000 ppm, in particular smaller than 800 ppm, preferably smaller than 500 ppm, based in each case on the dry graft copolymer B. The acrylonitrile content in the graft copolymer B is preferably reduced to a value smaller than 10 ppm, in particular smaller than or equal to 5 ppm, based in each case on the dry graft copolymer B. The 4-vinylcyclohexene content in the graft copolymer B is preferably reduced to a value smaller than or equal to 100 ppm, preferably smaller than or equal to 50 ppm, in particular smaller than or equal to 10 ppm, based in each case on the dry graft copolymer B.

For the purposes of the present invention, the mass unit ppm is based on mg/kg.

Residual monomers are unreacted monomers and conversion products of these, and also oligomers. In particular, total residual monomer content comprises the content of styrene, acrylonitrile, butadiene and 4-vinylcyclohexene (VCH), preferably the content of acrylonitrile, styrene and 4-vinylcyclohexene, particularly preferably the content of styrene and 4-vinylcyclohexene, in the graft copolymer B.

In a preferred embodiment, the dried graft copolymer B obtained in step c) has water content in the range from 0.05 to 0.8% by weight, preferably from 0.1 to 0.5% by weight, particularly preferably from 0.1 to 0.3% by weight, and total residual monomer content smaller than or equal to 2 000 ppm, preferably smaller than or equal to 1 000 ppm, in particular in the range from 10 to 2 000 ppm, preferably from 20 to 1 000 ppm, based in each case on the dry graft copolymer B.

Step d)

The step d) of the invention comprises the mixing of the thermoplastic copolymer A, of the dried graft copolymer B from step c) and optionally of the other component(s) K.

The methods and devices for carrying out the step d) are substantially known to the person skilled in the art. Step d) typically comprises melt compounding and/or melt extrusion and is preferably carried out in internal mixers, extruders and/or twin-screw systems.

The mixing in step d) is preferably achieved at temperatures of from 200 to 300° C.

The mixing of the thermoplastic copolymer A, of the at least one dried graft copolymer B from step c) and optionally of other components K can be achieved in a known manner, either successively or simultaneously. It is moreover possible to begin by mixing some components at temperatures of from 15 to 40° C., in particular at room temperature (about 20° C.), and then to increase the temperature to from 200 to 300° C., optionally with addition of other components.

The invention also provides the use of a fluidized-bed drier, preferably of a fluidized-bed drier which comprises one or more heat exchangers integrated into the fluidized bed and/or of a pneumatic drier (flash drier) in the production of a thermoplastic molding composition as described above for the drying of the graft copolymer B, the water content of which is smaller than or equal to 50% by weight, after the emulsion polymerization reaction, precipitation and mechanical dewatering of the graft copolymer B, in order to improve the surface quality of the thermoplastic molding composition. In particular, this is a thermoplastic ABS molding composition.

The embodiments described above, in particular the embodiments relating to the thermoplastic molding composition and components thereof, and also to the steps a) to d) are correspondingly applicable to the inventive use.

In a preferred embodiment, the invention provides the use as described above where the drying of the graft copolymer B is carried out in a fluidized-bed drier and/or a pneumatic drier by means of a drying gas selected from air and/or nitrogen, and the temperature of the drying gas is in the range from 50 to 160° C., preferably from 55 to 155° C., particularly preferably from 60 to 150° C.

In particular, the present invention provides the use as described above where the improvement in the surface quality of the thermoplastic molding composition comprises increased surface homogeneity of the thermoplastic molding composition and, respectively, of the molding produced therefrom. Increased surface homogeneity means in particular increased gloss and smoothness of the surface and/or a reduced extent of surface defects. Surface defects that may be mentioned are in particular spots (for example caused by salt inclusions), cracks and depressions (cavities).

In particular, the present invention provides the use as described above where the improvement in the surface quality of the thermoplastic molding composition comprises a reduced number of surface defects after storage of the molding composition under hot moist environmental conditions.

"Hot moist" environmental conditions are in particular conditions comprising a temperature and a humidity level exceeding the usual values of from 15 to 25° C. and from 30 to 60% relative humidity. Hot moist environmental conditions can moreover in particular comprise direct contact at the surface with liquid water. For the purposes of the invention, the expression hot moist environmental conditions in particular comprises a temperature in the range from 30 to 100° C., preferably from 40 to 90° C., particularly preferably from 50 to 80° C., and relative humidity in the range from 65 to 100%, preferably from 80 to 100% and/or direct action of liquid water at a temperature in the range from 30 to 100° C., preferably from 40 to 90° C., particularly preferably from 50 to 80° C., on the surface of the molding composition and, respectively, of the molding produced therefrom. The stated conditions are typically based on atmospheric pressure of 1.013 bar, the typical range being from 0.9 to 1.1 bar.

Relative humidity $f_R$ is generally the percentage ratio of absolute atmospheric moisture content f (mass of water vapor in a defined volume, e.g. in g/m$^3$) to maximal atmospheric moisture content $f_{max}$ at a given temperature. Maximal atmospheric moisture content $f_{max}$ is the maximal possible mass of water vapor in a defined volume of air at a given temperature (saturation). Relative humidity can be determined by the following formula $$f_R = (f/f_{max})*100\%$$

and therefore assumes values from 0 to 100%. When relative humidity is above 100%, water vapor generally condenses, for example in the form of fog.

In the light of the above, the invention preferably provides the use described above of a fluidized-bed drier, preferably of a fluidized-bed drier with one or more heat exchangers integrated into the fluidized bed, and/or of a pneumatic drier in the production of a thermoplastic molding composition for improving surface quality, where the improvement of the surface quality comprises a reduced number of surface defects after storage of the molding composition and, respectively, the moldings produced therefrom at a temperature in the range from 30 to 100° C. and at a relative humidity in the range from 65 to 100%, and/or direct action of liquid water at a temperature in the range from 30 to 100° C. on the surface of the molding composition (hot moist environmental conditions).

For the purposes of the invention, improvement of the surface quality means in particular that after storage for at least 1 hour, preferably after storage for a period of from 2 to 48 h, preferably from 5 to 24 h, under hot moist environmental conditions as described above the number of surface defects, in particular spots and/or depressions caused by salt inclusions, visible to the naked eye is small or zero. In particular, improvement of the surface quality means that after storage under hot moist conditions the number of surface defects, in particular spots and/or depressions, visible to the naked eye on an area of 150 cm$^2$ is less than 15, preferably less than 10, particularly preferably less than 6.

In a preferred embodiment, the improvement of the surface quality of the thermoplastic molding composition comprises the avoidance or prevention of salt inclusions with size greater than 0.3 mm, preferably greater than 0.2 mm and with particular preference greater than 0.1 mm. By virtue of the inventive use, formation of large salt inclusions visible to the naked human eye in the thermoplastic molding compositions and, respectively, in the moldings produced therefrom can in particular be avoided or reduced, in particular to the extent described above.

Salt inclusions not visible to the naked human eye are those that in respect of size and density are classified in accordance with DIN EN ISO 4628-2 as "1 S1". Surfaces without salt inclusions visible to the naked human eye are typically classified "0" in accordance with DIN EN ISO 4628-2.

The improvement of the surface quality preferably comprises, in the thermoplastic molding composition and, respectively, in the moldings produced therefrom, based on the total number of the salt inclusions visible to the naked human eye, a proportion of at least 80%, preferably at least 90%, in particular at least 99%, of salt inclusions of size smaller than 0.3 mm, preferably smaller than 0.2 mm, with particular preference smaller than 0.1 mm, very particularly preferably smaller than 0.01 mm. Size determined can preferably be the diameter of the salt inclusion. The improvement of the surface quality of the thermoplastic molding composition preferably comprises the avoidance or prevention of salt inclusions as described above after storage under hot moist conditions as defined above.

It is preferable that the salt inclusions comprise (or consist essentially of) salts comprised in the molding composition as a result of production processes, in particular salts which are used for the precipitation of the at least one graft copolymer B. The salt inclusions therefore preferably comprise salts of the abovementioned precipitants, for example magnesium sulfate, kieserite, pentahydrite, hexahydrite, epsomite, calcium chloride, sodium chloride or a mixture thereof. The inclusions can moreover also comprise salts derived from the acids used, for example sulfates, acetates and chlorides. The salt inclusions can moreover also comprise salts derived from other additives used in the production process, e.g. emulsifiers. The salt inclusions preferably comprise magnesium sulfate. With particular preference, the salt inclusions comprise magnesium sulfate as substantial constituent, for example more than 80% by weight thereof, based on the weight of the salt inclusions.

The invention preferably provides the abovementioned use where the graft copolymer B is the mixture of the graft copolymers B-I and B-II, in particular a mixture comprising the coprecipitated graft copolymers B-I and B-II.

The invention moreover provides the use of a fluidized-bed drier, preferably a fluidized-bed drier which comprises one or more heat exchangers integrated into the fluidized bed, and/or of a pneumatic drier (flash drier) in the production of a thermoplastic molding composition, as described above, for the drying of the graft copolymer B, the water content of which is smaller than or equal to 50% by weight, after the emulsion polymerization reaction, precipitation and mechanical dewatering of the graft copolymer B in order to reduce the total residual monomer content, preferably to a value below 2 000 ppm, in particular below 1 000 ppm, based in each case on the dry graft copolymer B. It is preferable that the use provides the drying of the graft copolymer B to below 1% by weight water content, preferably below 0.5% by weight.

The invention also provides thermoplastic molding compositions obtainable via the process of the invention, and also the moldings produced therefrom.

The invention preferably provides a thermoplastic molding composition obtainable via the process of the invention, where the thermoplastic molding composition comprises salt inclusions, and where the size of at least 80%, preferably at least 90%, in particular at least 99% (based on the total number of salt inclusions) is smaller than 0.3 mm, preferably smaller than 0.2 mm, with particular preference smaller than 0.1 mm, very particularly preferably smaller than 0.01 mm. The size stated is preferably the diameter of the salt inclusion or another characteristic length dimension.

In the invention, the thermoplastic molding composition comprises from 5 to 95% by weight, preferably from 40 to 80% by weight, of the at least one thermoplastic copolymer A, from 5 to 95% by weight, preferably from 20 to 60% by weight, of the at least one graft copolymer B and optionally from 0 to 90% by weight, preferably from 0 to 40% by weight, particularly preferably from 0 to 5% by weight, of at least one other component K. It is preferable that the molding composition comprises from 0 to 5% by weight of at least one other component K, where the other component is selected from conventional additives and additional substances. It is moreover preferable that the thermoplastic molding composition is an ABS blend comprising, as other component K, from 10 to 90% by weight, preferably from 10 to 87.5% by weight, particularly preferably from 10 to 50% by weight, based on the entire thermoplastic molding composition, of at least one rubber-free thermoplastic resin not composed of vinyl monomers and preferably selected from polycarbonates and polyamides.

The molding compositions of the invention can be used for the production of moldings of any type. These can be produced via injection molding, extrusion and blow molding processes. Another type of processing is the production of moldings via thermoforming from sheets or films previously produced, and the process of film-overmolding. Examples of these moldings are films, profiles, housing parts of any type, e.g. for household devices such as juice presses, coffee machines, mixers; for office equipment such as monitors, printers, copiers; exterior and interior parts of automobiles; sheets, pipes, electrical installation ducts, windows, doors and other profiles for the construction sector (fitting-out of interiors and outdoor applications), and also parts for electrical and electronic uses, such as switches, plugs and sockets.

In particular, the molding compositions of the invention can by way of example be used for the production of the following moldings:
Parts for the fitting-out of interiors of rail vehicles, ships, aircraft, buses and other motor vehicles, bodywork components for motor vehicles, housings of electrical equipment containing small transformers, housings for equipment for the processing and transmission of information, housings and cladding for medical equipment, massage equipment and housings therefor, toy vehicles for children, sheet-like wall elements, housings for safety equipment, thermally insulated transport containers, apparatus for the keeping or care of small animals, moldings for sanitary and bath equipment, protective grilles for ventilator openings, moldings for garden sheds and tool sheds, housings for garden equipment.

The embodiments described above relating to the thermoplastic molding composition, in particular to the thermoplastic copolymer A and the graft copolymer B, and relating to the steps a) to d) apply correspondingly to the molding composition of the invention and to moldings produced therefrom.

DESCRIPTION OF THE FIGURES

FIG. 1 relates to drying of the ABS powder ABS2 in example 5.1.

FIG. 2 relates to drying of the ABS powder ABS3 in example 5.2.

FIG. 3 relates to drying of the ABS powder ABS4 in example 5.3.

Figure 1:
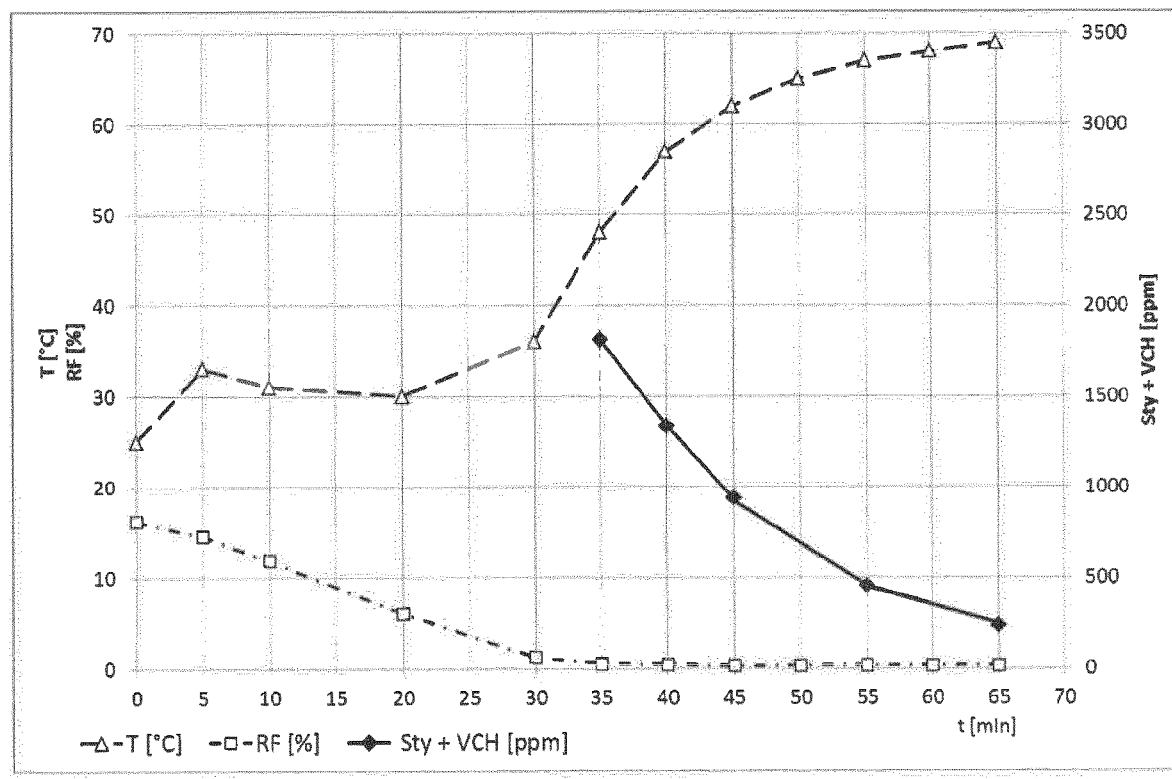
FIGS. 1 to 3 describe the content of styrene and 4-vinylcyclohexene (Sty+VCH) in ppm (solid diamond ♦), the residual moisture content (RF) in % by weight (hollow squares □) and the temperature of the graft copolymer powder (fluidized bed temperature) in ° C. (hollow triangles Δ) as a function of the drying time (t [min]) for drying in a fluidized-bed drier.

The examples and claims below provide further explanation of the invention.

EXAMPLES

Example 1—Production of the Components 1.1 Production of the ABS Rubbers ABS1 and ABS2 (Component B)
Graft Copolymer B-I 30 parts by weight (calculated as solid) of an anionically emulsified polybutadiene latex (graft base B1-A) with median particle diameter $d_{50}$ 299 nm and 60% by weight gel content and 30 parts by weight (calculated as solid) of an anionically emulsified polybutadiene latex (graft base B1-B) with median particle diameter $d_{50}$ 371 nm and 82% by weight gel content were mixed with deionized water to give about 27% by weight solids content. The respective polybutadiene lattices were produced by free-radical emulsion polymerization from a polybutadiene seed latex with median particle diameter $d_{50}$ 113 nm. The median particle diameter $d_{50}$ is the diameter at which 50% by volume of the particles (e.g. of the polybutadiene latex) are smaller than, and the other 50% by volume are larger than, the $d_{50}$ diameter.

The mixture was then heated to 60° C., and 0.25 part by weight of potassium peroxodisulfate (dissolved in water) was admixed therewith.

40 parts by weight of a mixture of 74.5% by weight of styrene; 25.5% by weight of acrylonitrile and 0.12 part by weight of tert-dodecyl mercaptan were then uniformly metered into the mixture within a period of 5 hours. In parallel therewith, 1.3 parts by weight (calculated as solid substance) of the sodium salt of a resin acid mixture (Burez DRS S70 E, Lawter BVBA, B-9130 Kallo, Belgium, dissolved in alkalinified water) were metered into the mixture over a period of 5 hours, and 0.25 part by weight of potassium peroxodisulfate (dissolved in deionized water) was likewise metered into the mixture over a period of 5 hours. During the course of the first three hours the reaction temperature was raised from 60° C. to 81° C. After all of the metered additions had ended, there followed two hours of postreaction time at 81° C., and the graft copolymer B-I was then cooled to room temperature. The gravimetrically determined solids content of the graft copolymer B-I (drying in a convection oven at 180° C., 23 minutes) was 34.9% by weight.

Graft Copolymer B-II 51.5 parts by weight (calculated as solid) of an anionically emulsified polybutadiene latex (graft base B1-C) with median particle diameter $d_{50}$ 113 nm and 91% by weight gel content were mixed with deionized water to give about 27% by weight solids content.

The polybutadiene latex was produced by free-radical seed polymerization from a polybutadiene seed latex with median particle diameter $d_{50}$ 49 nm.

The mixture was then heated to 60° C., and 0.25 part by weight of potassium peroxodisulfate (dissolved in water) was admixed therewith.

48.5 parts by weight of a mixture of 74.5% by weight of styrene; 25.5% by weight of acrylonitrile and 0.10 part by weight of tert-dodecyl mercaptan were then uniformly metered into the mixture within a period of 5 hours. In parallel therewith, one part by weight (calculated as solid substance) of the sodium salt of a resin acid mixture (Burez DRS S70 E, Lawter BVBA, B-9130 Kallo, Belgium, dissolved in alkalinified water) were metered into the mixture over a period of 5 hours, and 0.25 part by weight of potassium peroxodisulfate (dissolved in deionized water) was metered into the mixture over a period of 5 hours.

During the course of the first three hours the reaction temperature was raised from 60° C. to 81° C. After all of the metered additions had ended, there followed two hours of postreaction time at 81° C., and the graft copolymer B-II was then cooled to room temperature. The gravimetrically determined solids content of the graft copolymer B-II (drying in a convection oven at 180° C., 23 minutes) was 34.2% by weight.

Precipitated Graft Copolymer B

The graft copolymers B-I and B-II as described above were mixed by stirring in a ratio by weight of 60:40 (calculated as solid). 1.0% by weight of a phenolic antioxidant (Irganox 1076, BASF SE), based on the solid of the graft copolymers B-I and B-II, was added in the form of a dispersion to said mixture, and the resultant mixture was mixed.

A magnesium sulfate/sulfuric acid solution was then used for continuous coagulation. For this, the mixture of the graft copolymers B-I and B-II, a magnesium sulfate solution (18% by weight) and sulfuric acid (15% by weight) were metered continuously into a stirred precipitation container I which was maintained at 94° C. by introduction of steam. The following concentrations were maintained here in the precipitation container I:

2.6% by weight of magnesium sulfate, based on the mixture of the graft copolymers B-I and B-II, calculated as solid, 0.4% by weight of sulfuric acid (calculated as 100% strength material), based on the mixture of the graft copolymers B-I and B-II, calculated as solid, 18% by weight of mixture of the graft copolymers B-I and B-II, calculated as solid, based on all of the metered substances in the precipitation container.

The average residence time in the precipitation container was 15 minutes. In order to complete the precipitation, the contents of the precipitation container I were metered continuously into the precipitation container II. The average residence time in the precipitation container II was 15 minutes, and the temperature was maintained at about 92 to 94° C. After cooling of the precipitated mixture of the graft copolymers B-I and B-II from precipitation container II to 70° C., said mixture was isolated from the aqueous phase by centrifuging with centripetal acceleration of 320 g for 10 seconds. This gave a water-moist graft copolymer B with 30% by weight residual moisture content (ABS1).

Another sample of the precipitated graft copolymer B was cooled to 70° C. and then isolated from the aqueous phase by centrifuging with centripetal acceleration of 650 g for 60 seconds, to give a water-moist graft copolymer B with 16.2% by weight residual moisture content (ABS2).

1.2 Production of the ABS Rubber ABS3 (Component B)

The ABS rubber ABS3 (graft copolymer B) was produced in accordance with WO 2012/022710, page 28, "Graft rubber polymer 15" example. After precipitation with sulfuric acid, the water-moist graft copolymer ABS3 was isolated from the aqueous phase by centrifuging; residual moisture content was 31.8% by weight.

1.3 Production of the ABS Rubber ABS4 (Component B)

The ABS rubber ABS4 (graft copolymer B) was produced in accordance with WO 2014/170407 A1, pages 31-32, "Graft copolymer B-1" example. After precipitation with a magnesium sulfate solution, the water-moist graft copolymer B-IV was isolated from the aqueous phase by centrifuging; residual moisture content was 26.2% by weight.

Thermoplastic Copolymer A

Free-radical solution polymerization with peroxidic initiation was used to produce a random styrene/acrylonitrile copolymer (styrene: acrylonitrile ratio by weight 73:27) with weight-average molar mass $M_w$ 106 000 g/mol and number-average molar mass $M_n$ 15 000 g/mol. The molar masses $M_w$ and $M_n$ were determined by gel permeation chromatography with tetrahydrofuran as solvent and polystyrene calibration. Content of oligomer with molar mass below 1 000 g/mol was 1.0% by weight, likewise determined by gel permeation chromatography with tetrahydrofuran as solvent and polystyrene calibration. Determination of oligomer content in random styrene/acrylonitrile copolymers is described in K. Kirchner, H. Schlapkohl (Makromol. Chem. 177 (1976) 2031-2042, "The Formation of Oligomers in the Thermal Copolymerisation of the Styrene/Acrylonitrile-System").

Example 2: Drying of the Graft Copolymer B

Example 2A: Drying of the Graft Copolymer B (ABS1) by a Pneumatic Drier

The water-moist graft copolymer B (coprecipitated graft copolymers B-I and B-II, as described in Example 1.1 above) with 30% by weight residual moisture content (ABS1) was dried in a pneumatic drier with a nitrogen/air mixture with a proportion of less than 1% by volume of oxygen as carrier gas. The residence time required by the graft copolymer B to reach its final residual moisture content was typically from 5 to 10 seconds. The temperature of the carrier gas was 145° C. and the product temperature was 85° C. Residual moisture content after drying was 0.7% by weight. The material was obtained in the form of a fine-particle powder with median grain size $d_{50}$ 0.4 µm. The grain size $d_{50}$ was determined by sieve analysis in accordance with ISO 3310-1 with the following sieves: 63, 100, 150, 200, 300, 500, 800 and 2000 µm.

Example 2B: Drying of the Graft Copolymer B (ABS1) by a Fluidized-Bed Drier

The water-moist graft copolymer B (coprecipitated graft copolymers B-I and B-II, as described in Example 1.1 above) with 30% by weight residual moisture content (ABS1) was dried in a fluidized-bed drier with air as carrier gas. The residence time was 35 minutes. The temperature of the air was 80° C. and the product temperature was 48° C. Residual moisture content after drying was 0.5% by weight. The material was obtained in the form of a fine-particle powder with median grain size $d_{50}$ 0.4 µm (by means of sieve analysis in accordance with ISO 3310-1).

Example 2C: Drying of the Graft Copolymer B in a Convection Oven

The water-moist graft copolymer B (coprecipitated graft copolymers B-I and B-II, as described in Example 1.1 above) with 30% by weight residual moisture content (ABS1) was dried in a convection oven for 2 days at 70° C. until residual moisture content was 0.7% by weight. The material was obtained in the form of a fine-particle powder with median grain size $d_{50}$ 0.4 µm (by means of sieve analysis in accordance with ISO 3310-1).

Example 2D: Drying of the Graft Copolymer B in an Extruder with Simultaneous Processing to Give Moldings Drying of the water-moist graft copolymer B (coprecipitated graft copolymers B-I and B-II with 30% by weight residual moisture content as described above) (ABS1) was carried out in accordance with the patent application EP-A 0734825.

For this, the graft copolymer B was dewatered mechanically in a twin-screw extruder. The thermoplastic copolymer A and silicone oil were introduced as melt into the twin-screw extruder and mixed with the graft copolymer B, and after extrusion the ABS molding compositions F4 here were obtained as pellets by way of a die plate and pelletizer.

The molding composition F4 was obtained as pellets in a single step and then processed to give moldings. Table 1 below gives the constitution of the ABS molding composition F4.

Example 3: Production of ABS Molding Compositions and ABS Moldings

The graft copolymers B described above in Examples 2A to 2C were mixed in a ZSK 25 (Coperion) extruder with the thermoplastic copolymer A and 0.10 part by weight of a polydimethylsiloxane with viscosity 1000 centistokes, and pelletized. Table 1 below gives the proportions.

The resultant pellets were used to produce plaques (75×50×2.5 mm) in an injection mold with polished surface at 240° C. melt temperature and 70° C. mold temperature.

Example 4: Testing of Surface Homogeneity

In order to simulate hot moist environmental conditions, the plaques (75×50×2.5 mm) were stored at 80° C. in deionized water for 8 hours. The plaques were dried, and then visible surface defects were counted by the naked eye at a viewing distance of about 30 to 40 cm; the number of surface defects (specks) is stated.

Four plaques were tested from each molding composition. The test evaluated only the polished area. The number of surface defects on a test area totaling 150 cm² was therefore counted, and is stated in Table 1 below.

TABLE 1

Constitution of, and test data for, molding compositions F1 to F4

| | | Molding compositions | | | |
|---|---|---|---|---|---|
| | | F1 inventive | F2 inventive | F3 noninventive | F4 noninventive |
| Graft copolymer of example 2A | % by wt. | 48.2 | | | |
| Graft copolymer of example 2B | % by wt. | | 48.2 | | |
| Graft copolymer of example 2C | % by wt. | | | 48.2 | |
| Graft copolymer of example 2D | % by wt. | | | | 48.2 |
| Copolymer A | % by wt. | 51.7 | 51.7 | 51.7 | 51.7 |
| Polydimethylsiloxane | % by wt. | 0.1 | 0.1 | 0.1 | 0.1 |
| Sum | % by wt. | 100 | 100 | 100 | 100 |
| Number of surface defects | number | 0 | 4 | 21 | 22 |

The molding compositions F1 and F2 are molding compositions of the invention, i.e. molding compositions comprising graft copolymers B dried in the invention. The molding compositions F3 and F4 are comparative examples comprising graft copolymers B not dried in the invention.

From the test results on the molding compositions F1 to F4 it can be seen that the molding compositions produced by the process of the invention, and, respectively, moldings produced therefrom, exhibit a small number of surface defects (specks) and therefore better surface homogeneity after storage in a hot moist environment, while the resultant number of surface defects is significantly higher for the molding compositions not of the invention. It is possible that drying in the fluidized-bed drier or in a pneumatic drier results in particularly rapid and uniform drying, leading to small dimensions of salt inclusions (e.g. salt crystals), which cause few surface defects visible to the naked eye.

Example 5: Testing for Residual Monomer Content

Residual monomer content as a function of drying in the fluidized-bed drier was tested as described above on the following ABS graft copolymers (component B):

ABS2 Graft copolymer B produced as described in Example 1.1, with 16.2% by weight residual moisture content;

ABS3 Graft copolymer B produced as described in Example 1.2, with 31.8% by weight residual moisture content;

ABS4 Graft copolymer B produced as described in Example 1.3, with 26.2% by weight residual moisture content;

2A Graft copolymer B produced as described in Example 1.1 and dried in the pneumatic drier as in Example 2A with 0.7% by weight residual moisture content.

In each case, styrene (Sty) content and 4-vinylcyclohexene (VCH) content were determined by means of headspace gas chromatography with external calibration with use of para-xylene as internal standard. For this, in each case 1 g of the graft copolymer powder was dispersed by shaking in 5 g of dimethyl sulfoxide with added internal standard and subjected to headspace gas chromatography measurement at a sample temperature of 94° C. The temperature of the injection needle was 98° C., and the temperature of the transfer line between the headspace autosampler and the gas chromatograph was 135° C. The headspace autosampler used was a PerkinElmer HS-40 and the gas chromatograph used was a Hewlett Packard 5890 Series II. The total content of styrene and 4-vinylcyclohexene is also stated in ppm, the reference variable here being the input weight of the graft copolymer powder.

The ABS graft copolymers were dried in a fluidized-bed drier in a manner similar to that described in Example 2B 5.1 Drying of ABS2

The water-moist ABS2 with 16.2% by weight residual moisture content was dried in a fluidized-bed drier with air as carrier gas. Total residence time was 65 min. Air temperature was 80° C. Table 2 collates the temperature profile of the graft polymer powder B (product temperature or fluidized bed temperature), the residual moisture content, and also the total content of residual monomers styrene and 4-vinylcyclohexene.

TABLE 2

Drying of the graft copolymer ABS2 by a fluidized-bed drier

| Drying time [min] | Fluidized bed temperature [° C.] | Residual moisture content [% by wt.] | Sty + VCH [ppm] |
|---|---|---|---|
| 0 | 25 | 16.2 | n.d. |
| 5 | 33 | 14.5 | n.d. |
| 10 | 31 | 11.9 | n.d. |
| 20 | 30 | 6.1 | n.d. |
| 30 | 36 | 1.2 | n.d. |
| 35 | 48 | 0.5 | 1809 |
| 40 | 57 | 0.4 | 1335 |
| 45 | 62 | 0.3 | 933 |
| 50 | 65 | 0.3 | n.d. |
| 55 | 67 | 0.3 | 451 |
| 60 | 68 | 0.3 | n.d. |
| 65 | 69 | 0.3 | 235 | n.d.: not determined

Product temperature after the first 35 min was 48° C. After this first drying phase, after 35 min, residual moisture content was 0.5% by weight and the content of styrene and 4-vinylcyclohexene was 1 809 ppm. The material was obtained in the form of a fine-particle powder with $d_{50}$ median grain size 0.4 μm.

Drying in the fluidized-bed drier was then carried out for a further 30 minutes, with unchanged air temperature of 80° C. The quantities of the volatile compounds styrene and 4-vinylcyclohexene decreased here from a total of 1 809 ppm to 235 ppm.

The results are also depicted in FIG. 1. FIG. 1 describes the content of styrene and 4-vinylcyclohexene (Sty+VCH) in ppm (solid diamond ♦), residual moisture content (RF) in % by weight (hollow squares □), and the temperature of the graft copolymer powder in ° C. (hollow triangles Δ) as a function of drying time (t [min]).

5.2 Drying of ABS3

The water-moist ABS with 31.8% by weight residual moisture content was dried in a fluidized-bed drier with air as carrier gas. Total residence time was 85 min.

Air temperature was 80° C. Table 3 collates the temperature profile of the graft polymer powder B (product temperature or fluidized bed temperature), the residual moisture content, and also the total content of residual monomers styrene and 4-vinylcyclohexene.

TABLE 3

Drying of the graft copolymer ABS3 by a fluidized-bed drier

| Drying time [min] | Fluidized bed temperature [° C.] | Residual moisture content [% by wt.] | Sty + VCH [ppm] |
|---|---|---|---|
| 0 | 29 | 31.8 | n.d. |
| 5 | 29 | 30.3 | n.d. |
| 10 | 29 | 29.2 | n.d. |
| 15 | 29 | 27.1 | n.d. |
| 20 | 29 | 24.5 | n.d. |
| 30 | 29 | 15.5 | n.d. |
| 40 | 29 | 13.2 | n.d. |
| 50 | 29 | 7.2 | n.d. |
| 55 | 30 | 2.5 | 6946 |
| 60 | 39 | 0.9 | 6481 |
| 65 | 57 | 0.7 | 4623 |
| 70 | 63 | 0.6 | n.d. |
| 75 | 66 | 0.5 | 1743 |
| 80 | 68 | 0.4 | n.d. |
| 85 | 69 | 0.3 | 677 | n.d.: not determined

Product temperature after the first 60 min was 39° C. After this first drying phase, after 60 min, residual moisture content was 0.9% by weight and the content of styrene and 4-vinylcyclohexene was 6 481 ppm. The material was obtained in the form of a fine-particle powder with $d_{50}$ median grain size 0.54 μm (determined by means of sieve analysis in accordance with ISO 3310-1).

Drying in the fluidized-bed drier was then carried out for a further 25 minutes, with unchanged air temperature of 80° C. The quantities of the volatile compounds styrene and 4-vinylcyclohexene decreased here from a total of 6 481 ppm to 677 ppm.

Figure 2:
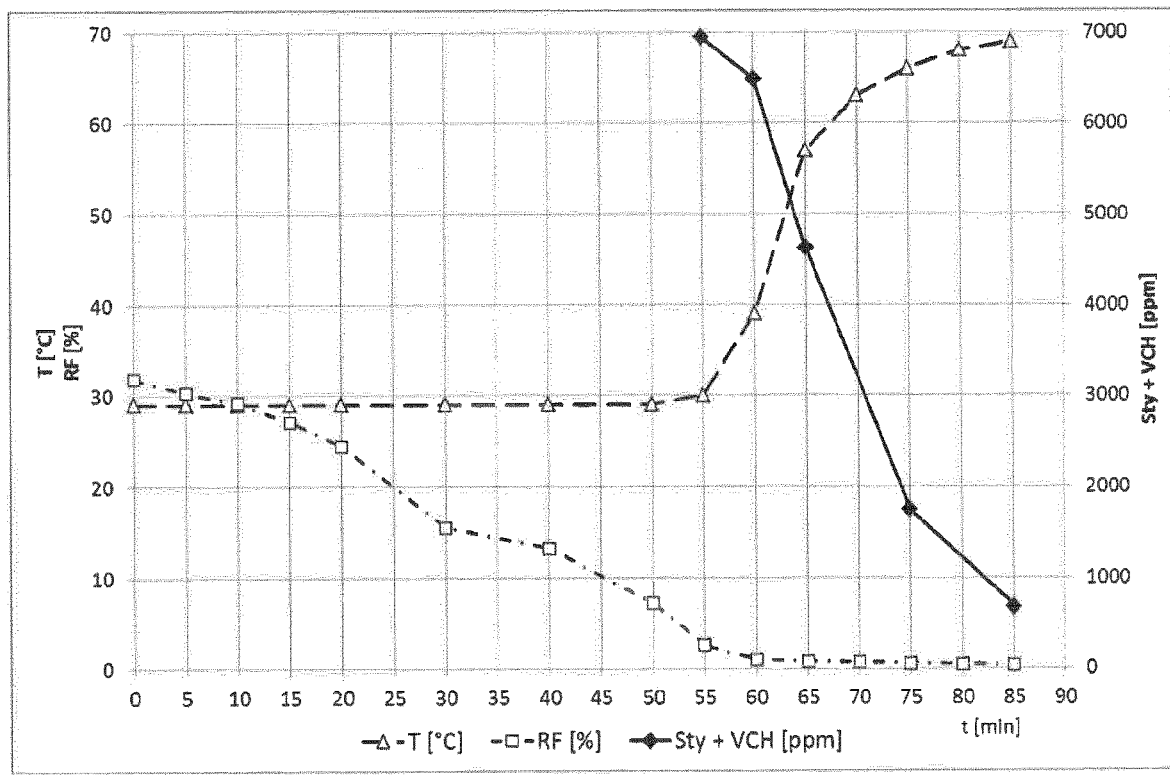

The results are also depicted in FIG. 2. FIG. 2 describes the content of styrene and 4-vinylcyclohexene (Sty+VCH) in ppm (solid diamond ♦), residual moisture content (RF) in % by weight (hollow squares ☐), and the temperature of the graft copolymer powder in ° C. (hollow triangles Δ) as a function of drying time (t [min]).

5.3 Drying of ABS4

The water-moist graft copolymer ABS4 with 26.2% by weight residual moisture content was dried in a fluidized-bed drier with air as carrier gas. Total residence time was 75 min. Air temperature was 80° C. Table 4 collates the temperature profile of the graft polymer powder B (product temperature or fluidized bed temperature), the residual moisture content, and also the total content of residual monomers styrene and 4-vinylcyclohexene.

TABLE 4

Drying of the graft copolymer ABS4 by a fluidized-bed drier

| Drying time [min] | Fluidized bed temperature [° C.] | Residual moisture content [% by wt.] | Sty + VCH [ppm] |
|---|---|---|---|
| 0 | 30 | 26.3 | n.d. |
| 5 | 30 | 23.8 | n.d. |
| 10 | 30 | 21 | n.d. |
| 20 | 30 | 15.2 | n.d. |
| 25 | 30 | 12.2 | n.d. |
| 30 | 30 | 9.6 | n.d. |
| 35 | 30 | 6.6 | n.d. |
| 40 | 32 | 3.4 | n.d. |
| 45 | 41 | 1.3 | 2133 |
| 50 | 54 | 0.6 | 1766 |
| 55 | 61 | 0.4 | 1249 |
| 60 | 65 | 0.3 | n.d. |
| 65 | 67 | 0.4 | 536 |
| 70 | 68 | 0.3 | n.d. |
| 75 | 69 | 0.3 | 235 | n.d.: not determined

Product temperature after the first 45 min was 41° C. After this first drying phase, after 45 min, residual moisture content was 1.3% by weight and the content of styrene and 4-vinylcyclohexene was 2 133 ppm.

The material was obtained in the form of a fine-particle powder with $d_{50}$ median grain size 0.37 μm. Drying in the fluidized-bed drier was then carried out for a further 30 minutes, with unchanged air temperature of 80° C. The quantities of the volatile compounds styrene and 4-vinylcyclohexene decreased here from a total of 2 133 ppm to 235 ppm.

Figure 3:
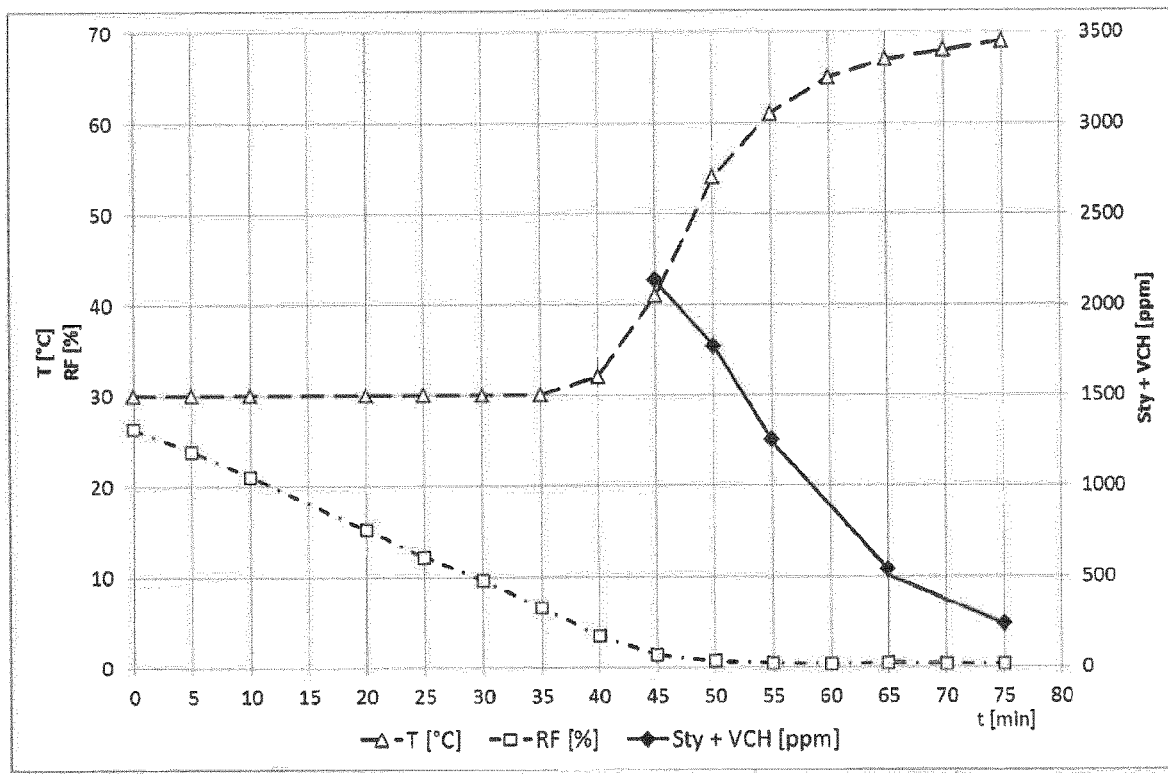

The results are also depicted in FIG. 3. FIG. 3 describes the content of styrene and 4-vinylcyclohexene (Sty+VCH) in ppm (solid diamond ♦), residual moisture content (RF) in % by weight (hollow squares ☐), and the temperature of the graft copolymer powder in ° C. (hollow triangles Δ) as a function of drying time (t [min]).

5.4 Combination of Pneumatic Drier and Fluidized-Bed Drier

The graft copolymer 2A dried in the pneumatic drier with 0.7% by weight residual moisture content and $d_{50}$ median grain size 0.4 μm and 5 147 ppm content of styrene and 4-vinylcyclohexene (Example 2A above) was dried in a fluidized-bed drier with air as carrier gas. Residual monomer content (total of styrene and 4-vinylcyclohexene) is collated in Table 5.

Residence time in the fluidized-bed drier was 20 minutes. Average product temperature was 70° C. The total quantities of the volatile compounds styrene and 4-vinylcyclohexene decreased here from a total of 5 147 ppm to 255 ppm. The residual moisture content of the dried graft copolymer 2A was 0.3% by weight.

TABLE 5

Drying of the graft copolymer 2A by a fluidized-bed drier

| Drying time [min] | Sty + VCH [ppm] |
|---|---|
| 0 | 5147 |
| 2.5 | 3750 |
| 5 | 2524 |
| 7.5 | 1760 |
| 10 | 1280 |
| 12.5 | 878 |
| 15 | 606 |
| 17.5 | 379 |
| 20 | 255 |

5.5 Production of Thermoplastic Molding Compositions and Moldings, and Testing of Surface Homogeneity The ABS graft copolymer powders dried in Examples 5.1 to 5.4 were used as component B for the production of ABS molding compositions and ABS moldings. For this, the dried graft copolymers 5.1 to 5.4 were, as described in Example 3, mixed with the thermoplastic copolymer A and polydimethylsiloxane with viscosity 1000 centistokes in a ZSK 25 extruder (Coperion) and pelletized. Table 6 below gives the proportions.

The resultant pellets were used to produce plaques in an injection mold with polished surface as described in Example 3. The surface homogeneity of the plaques in a hot moist environment was tested as described in Example 4. Table 6 below gives the results.

TABLE 6

Constitution of, and test data for, molding compositions F5 to F8

| | | | Molding compositions | | | |
|---|---|---|---|---|---|---|
| | | Comment | F5 inventive | F6 inventive | F7 inventive | F8 inventive |
| Graft copolymer 5.1 | % by wt. | ABS2, dried | 48.2 | | | |

TABLE 6-continued

Constitution of, and test data for, molding compositions F5 to F8

| | | Comment | Molding compositions | | | |
|---|---|---|---|---|---|---|
| | | | F5 inventive | F6 inventive | F7 inventive | F8 inventive |
| Graft copolymer 5.2 | % by wt. | ABS3, dried | | 46.7 | | |
| Graft copolymer 5.3 | % by wt. | ABS4, dried | | | 46.7 | |
| Graft copolymer 5.4 | % by wt. | 2A, dried (combination of pneumatic drier and fluidized-bed drier) | | | | 48.2 |
| Copolymer A | % by wt. | | 51.7 | 53.225 | 53.225 | 51.7 |
| Polydimethyl-siloxane | % by wt. | | 0.1 | 0.075 | 0.075 | 0.1 |
| Total | % by wt. | | 100 | 100 | 100 | 100 |
| Number of surface defects | number | | 0 | 7 | 11 | 0 |

It was found that the molding compositions F5 to F8 of the invention, produced from a graft copolymer B with lower residual monomer content and lower water content (dried to a greater extent) than the molding compositions F1 and F2 (Table 1) of the invention have similarly good surface homogeneity. The molding compositions F5 to F8 of the invention additionally feature reduced residual monomer content, in particular of styrene and 4-vinylcyclohexene, in comparison with the molding compositions F1 to F4.

What is claimed is:

1. A process for the production of a thermoplastic molding composition comprising:
   A: from 5 to 95% by weight of at least one thermoplastic copolymer A produced from:
      A1: from 50 to 95% by weight, based on the copolymer A, of a monomer A1 selected from styrene, α-methylstyrene, and mixtures of styrene and at least one other monomer selected from α-methylstyrene, p-methylstyrene, and $C_1$-$C_8$-alkyl (meth)acrylate,
      A2: from 5 to 50% by weight, based on the copolymer A, of a monomer A2 selected from acrylonitrile and mixtures of acrylonitrile and at least one other monomer selected from methacrylonitrile, anhydrides of unsaturated carboxylic acids, and imides of unsaturated carboxylic acids,
   B: from 5 to 95% by weight of at least one graft copolymer B comprising:
      B1: from 40 to 85% by weight, based on the graft copolymer B, of at least one graft base B1 which is obtained via emulsion polymerization of:
         B11: from 50 to 100% by weight, based on the graft base B1, of butadiene,
         B12: from 0 to 50% by weight, based on the graft base B1, of at least one other monomer B12 selected from styrene, α-methylstyrene, acrylonitrile, methacrylonitrile, isoprene, chloroprene, $C_1$-$C_4$-alkylstyrene, $C_1$-$C_8$-alkyl (meth)acrylate, alkylene glycol di(meth)acrylate, and divinylbenzene;
         where the total quantity of B11+B12 is exactly 100% by weight; and
      B2: from 15 to 60% by weight, based on the graft copolymer B, of a graft shell B2 which is obtained via emulsion polymerization in the presence of the at least one graft base B1 of:
         B21: from 50 to 95% by weight, based on the graft shell B2, of a monomer B21 selected from styrene and mixtures of styrene and at least one other monomer selected from α-methylstyrene, p-methylstyrene, and $C_1$-$C_8$-alkyl (meth)acrylate,
         B22: from 5 to 50% by weight, based on the graft shell B2, of a monomer B22 selected from acrylonitrile and mixtures of acrylonitrile and at least one other monomer selected from methacrylonitrile, anhydrides of unsaturated carboxylic acids, and imides of unsaturated carboxylic acids;
      where the total quantity of graft base B1 and graft shell B2 is exactly 100% by weight; and
   K: from 0 to 90% by weight of at least one other component K,
   comprising the following steps:
   a) precipitation of the at least one graft copolymer B after the emulsion polymerization reaction via addition of a precipitation solution comprising at least one salt and/or at least one inorganic acid;
   b) mechanical dewatering of the precipitated graft copolymer B, where a graft copolymer B with water content smaller than or equal to 50% by weight is obtained;
   c) drying of the dewatered graft copolymer B with use of a drying gas, where the graft copolymer B is caused to move in the drying gas and the temperature of the drying gas is in the range from 50 to 160° C.; and
   d) mixing of the thermoplastic copolymer A, of the at least one dried graft copolymer B, and optionally of the other component(s) K.

2. The process of claim 1, wherein the drying of the dewatered graft copolymer B in step c) takes place with use of a fluidized-bed drier and/or of a pneumatic drier.

3. The process of claim 1, wherein the median particle diameter $d_{50}$ of the graft base B1 is in the range from 100 to 1000 nm.

4. The process of claim 1, wherein the graft copolymer B is a mixture of at least two graft copolymers B-I and B-II, where:

graft copolymer B-I is obtained via emulsion polymerization of a mixture of the monomers B21 and B22 in the presence of a graft base B1-A which has a median particle diameter $d_{50}$ in the range from 230 to 330 nm and of a graft base B1-B which has a median particle diameter $d_{50}$ in the range from 340 to 480 nm; and graft copolymer B-II is obtained via emulsion polymerization of a mixture of the monomers B21 and B22 in the presence of a graft base B1-C which has a median particle diameter $d_{50}$ in the range from 10 to 220 nm.

5. The process of claim 4, wherein in step a) the graft copolymers B-I and B-II are mixed and the mixture of the graft copolymers is precipitated via addition of the precipitation solution comprising at least one salt.

6. The process of claim 1, wherein the drying in step c) is carried out by means of a drying gas selected from air and/or nitrogen, where:
the drying is carried out with use of a fluidized-bed drier and the temperature of the drying gas is in the range from 50 to 100° C.; or
the drying is carried out with use of a pneumatic drier and the temperature of the drying gas is in the range from 100 to 160° C.

7. The process of claim 1, wherein the drying in step c) is carried out by means of a drying gas selected from air and/or nitrogen, where:
the drying is carried out with use of a fluidized-bed drier, the temperature of the drying gas is in the range from 50 to 100° C., and the average residence time of the graft copolymer B in the fluidized-bed drier is from 10 to 60 min; or
the drying is carried out with use of a pneumatic drier, the temperature of the drying gas is in the range from 100 to 160° C., and the average residence time of the graft copolymer B in the pneumatic drier is from 1 to 300 seconds.

8. The process of claim 1, wherein the drying in step c) is carried out by means of a drying gas selected from air and/or nitrogen, where:
the drying is carried out with use of a fluidized-bed drier which has one or more heat exchangers integrated into the fluidized bed, the temperature of the drying gas is in the range from 50 to 100° C., and the heat exchanger is operated at a temperature in the range from 50 to 100° C.

9. The process of claim 1, wherein the dried graft copolymer B obtained in step c) has water content in the range from 0.05 to 0.8% by weight and total residual monomer content smaller than or equal to 2,000 ppm.

10. The process of claim 1, wherein a fluidized-bed drier and/or of a pneumatic drier is used in the production of a thermoplastic molding composition for the drying of the graft copolymer B, the water content of which is less than or equal to 50% by weight, after the emulsion polymerization reaction, precipitation, and mechanical dewater of the graft copolymer B, in order to improve the surface quality of the thermoplastic molding composition.

11. The process of claim 9, wherein the drying of the graft copolymer B is carried out in a fluidized-bed drier and/or a pneumatic drier by means of a drying gas selected from air and/or nitrogen, and the temperature of the drying gas is in the range from 50 to 160° C.

12. The process of claim 9, wherein the improvement of the surface quality of the thermoplastic molding composition comprises a reduced number of surface defects after storage of the molding composition at a temperature in the range from 30 to 100° C. and relative humidity in the range from 65 to 100% and/or direct action of liquid water at a temperature in the range from 30 to 100° C. on the surface of the molding composition.

13. The process of claim 1, wherein a fluidized-bed drier and/or of a pneumatic drier is used in the production of a thermoplastic molding composition for the drying of the graft copolymer B, the water content of which is smaller than or equal to 50% by weight, after emulsion polymerization, precipitation, and mechanical dewatering of the graft copolymer B, in order to reduce total residual monomer content in the graft copolymer B.

14. A thermoplastic molding composition obtained by a process of claim 1, where the thermoplastic molding composition comprises salt inclusions and where the size of at least 80% of the salt inclusions, based on the total number of the salt inclusions, is smaller than 0.3 mm.

15. A molding produced from a thermoplastic molding composition of claim 14.

* * * * *